United States Patent
Nguyen et al.

(10) Patent No.: US 10,249,131 B2
(45) Date of Patent: *Apr. 2, 2019

(54) GAMING SYSTEM INCLUDING A GAMING TABLE AND A PLURALITY OF USER INPUT DEVICES

(71) Applicant: IGT, Las Vegas, NV (US)

(72) Inventors: Binh T. Nguyen, Reno, NV (US); Richard E. Rowe, Las Vegas, NV (US); Mark C. Nicely, Daly City, CA (US); Bryan D. Wolf, Reno, NV (US); Brian Underdahl, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/499,147

(22) Filed: Apr. 27, 2017

(65) Prior Publication Data

US 2017/0228960 A1     Aug. 10, 2017

Related U.S. Application Data

(63) Continuation of application No. 14/834,056, filed on Aug. 24, 2015, now Pat. No. 9,640,027, which is a
(Continued)

(51) Int. Cl.
*A63F 9/24* (2006.01)
*G07F 17/32* (2006.01)
(Continued)

(52) U.S. Cl.
CPC ............ *G07F 17/322* (2013.01); *A63F 13/12* (2013.01); *A63F 13/23* (2014.09); *G06F 3/0236* (2013.01);
(Continued)

(58) Field of Classification Search
CPC ..................... A63F 13/12; A63F 13/23; G06F 2203/04808; G06F 3/0236; G06F 3/0412;
(Continued)

(56) References Cited

U.S. PATENT DOCUMENTS 4,357,015 A   11/1982   Santora et al.
4,861,041 A   8/1989    Jones et al.
(Continued)

FOREIGN PATENT DOCUMENTS

EP   0956111    11/1999
EP   1226851    7/2002
(Continued)

OTHER PUBLICATIONS

PCT International Preliminary Report on Patentability dated Apr. 14, 2011 issued in PCT/US2009/056812.
(Continued)

*Primary Examiner* — Justin Myhr
(74) *Attorney, Agent, or Firm* — Neal, Gerber & Eisenberg LLP

(57) ABSTRACT

Intelligent gaming tables and methods of providing game play through the gaming tables are described herein. The gaming table includes a table having a table surface, a plurality of player stations, and a common display configured to display gaming content to a plurality of players. The gaming table further includes an interface configured to communicate with a plurality of user input devices. The gaming table includes a gaming controller. The gaming controller is configured to communicate with the plurality of user input devices through the interface, receive location information relating to touches or contacts detected on the table surface, analyze the information relating to the touches or contacts, identify a user performing each of the touches or contacts with the table surface, and implement player
(Continued)

input instructions contained within the information relating to the touches or contacts.

22 Claims, 14 Drawing Sheets

Related U.S. Application Data continuation of application No. 14/022,084, filed on Sep. 9, 2013, now Pat. No. 9,129,473, which is a continuation of application No. 12/244,725, filed on Oct. 2, 2008, now Pat. No. 8,529,345.

(51) Int. Cl.

| | | |
|---|---|---|
| *G06F 3/041* | (2006.01) | |
| *G06F 3/0484* | (2013.01) | |
| *G06F 3/0488* | (2013.01) | |
| *G06F 3/023* | (2006.01) | |
| *G06F 3/0482* | (2013.01) | |
| *A63F 13/23* | (2014.01) | |
| *A63F 13/30* | (2014.01) | |

(52) U.S. Cl.
CPC .......... *G06F 3/0412* (2013.01); *G06F 3/0416* (2013.01); *G06F 3/0482* (2013.01); *G06F 3/0484* (2013.01); *G06F 3/04886* (2013.01); *G07F 17/3209* (2013.01); *G07F 17/3211* (2013.01); *G07F 17/3218* (2013.01); *G07F 17/3225* (2013.01); *G07F 17/3227* (2013.01); *G07F 17/3251* (2013.01); *G07F 17/3272* (2013.01); *G06F 2203/04808* (2013.01); *G07F 17/3204* (2013.01); *G07F 17/3262* (2013.01)

(58) Field of Classification Search
CPC .... G06F 3/0416; G06F 3/0482; G06F 3/0484; G06F 3/04886; G06F 3/0488; G06F 1/1626; G06F 2200/1636; G07F 17/3204; G07F 17/3209; G07F 17/3211; G07F 17/3218; G07F 17/322; G07F 17/3225; G07F 17/3262; G07F 17/3227; G07F 17/3223; G07F 17/3206; G07F 17/3251; G07F 17/3272

See application file for complete search history.

(56) References Cited

U.S. PATENT DOCUMENTS

| | | | |
|---|---|---|---|
| 4,906,005 | A | 3/1990 | Manabe |
| 5,102,135 | A | 4/1992 | Addiechi |
| 5,636,838 | A | 6/1997 | Caro |
| 5,651,548 | A | 7/1997 | French et al. |
| 5,735,742 | A | 4/1998 | French |
| 5,743,800 | A | 4/1998 | Huard et al. |
| 5,755,440 | A | 5/1998 | Sher |
| 5,839,955 | A | 11/1998 | Mangano et al. |
| 5,934,999 | A | 8/1999 | Valdez |
| 6,039,648 | A | 3/2000 | Guinn et al. |
| 6,053,823 | A | 4/2000 | Mathews |
| 6,059,658 | A | 5/2000 | Mangano et al. |
| 6,059,659 | A | 5/2000 | Busch et al. |
| 6,082,887 | A | 7/2000 | Feuer et al. |
| 6,083,105 | A | 7/2000 | Ronin et al. |
| 6,135,884 | A | 10/2000 | Hedrick et al. |
| 6,152,448 | A | 11/2000 | Cudlipp |
| 6,209,869 | B1 | 4/2001 | Mathews |
| 6,217,022 | B1 | 4/2001 | Astaneha |
| 6,246,393 | B1 | 6/2001 | Watanabe et al. |
| 6,309,299 | B1 | 10/2001 | Weiss |
| 6,312,334 | B1 | 11/2001 | Yoseloff |
| 6,497,409 | B2 | 12/2002 | Mathews |
| 6,498,590 | B1 | 12/2002 | Dietz et al. |
| 6,533,662 | B2 | 3/2003 | Soltys et al. |
| 6,659,462 | B1 | 12/2003 | Scott |
| 6,666,766 | B2 | 12/2003 | Baerlocher et al. |
| 6,705,944 | B2 | 3/2004 | Luciano |
| 6,726,563 | B1 | 4/2004 | Baerlocher et al. |
| 6,726,565 | B2 | 4/2004 | Hughs-Baird |
| 6,733,388 | B2 | 5/2004 | Mothwurf |
| 6,733,390 | B2 | 5/2004 | Walker et al. |
| 6,743,094 | B2 | 6/2004 | Johnson |
| 6,800,029 | B2 | 10/2004 | Rowe et al. |
| 6,806,868 | B2 | 10/2004 | Chuang |
| 6,851,674 | B2 | 2/2005 | Pierce et al. |
| 6,869,359 | B1 | 3/2005 | Mathews |
| 6,890,255 | B2 | 5/2005 | Jarvis et al. |
| 6,908,385 | B2 | 6/2005 | Green |
| 6,921,333 | B2 | 7/2005 | Taguchi |
| 6,988,731 | B2 | 1/2006 | Inoue |
| 7,012,595 | B2 | 3/2006 | Lu |
| 7,029,395 | B1 | 4/2006 | Baerlocher |
| 7,030,861 | B1 | 4/2006 | Westerman et al. |
| 7,052,011 | B2 | 5/2006 | Pierce et al. |
| 7,059,603 | B1 | 6/2006 | D'avanzo |
| 7,094,150 | B2 | 8/2006 | Ungaro et al. |
| 7,169,044 | B2 | 1/2007 | Baerlocher et al. |
| 7,204,428 | B2 | 4/2007 | Wilson |
| 7,223,172 | B2 | 5/2007 | Baerlocher et al. |
| 7,226,357 | B2 | 6/2007 | Vancura et al. |
| 7,306,520 | B2 | 12/2007 | Kaminkow et al. |
| 7,329,179 | B2 | 2/2008 | Baerlocher |
| 7,331,868 | B2 | 2/2008 | Beaulieu et al. |
| 7,351,146 | B2 | 4/2008 | Kaminkow |
| 7,374,486 | B2 | 5/2008 | Baerlocher |
| 7,397,464 | B1 | 7/2008 | Robbins et al. |
| 7,419,162 | B2 | 9/2008 | Lancaster et al. |
| 7,463,270 | B2 | 12/2008 | Vale et al. |
| 7,465,227 | B2 | 12/2008 | Baerlocher |
| 7,470,185 | B2 | 12/2008 | Baerlocher |
| 7,478,812 | B2 | 1/2009 | Sokolov |
| 7,479,949 | B2 | 1/2009 | Jobs et al. |
| 7,488,251 | B2 | 2/2009 | Kaminkow |
| 7,846,018 | B2 | 12/2010 | Baerlocher |
| 8,016,665 | B2 | 9/2011 | Gururajan et al. |
| 8,087,999 | B2 | 1/2012 | Oberberger et al. |
| 8,152,624 | B2 | 4/2012 | Gerrard et al. |
| 8,167,711 | B2 | 5/2012 | Baerlocher |
| 8,231,456 | B2 | 7/2012 | Zielinski |
| 8,430,408 | B2 | 4/2013 | Baerlocher et al. |
| 2001/0000118 | A1 | 4/2001 | Sines et al. |
| 2002/0037765 | A1 | 3/2002 | Johnson |
| 2002/0077167 | A1 | 6/2002 | Merari |
| 2002/0077170 | A1 | 6/2002 | Johnson et al. |
| 2002/0119824 | A1 | 8/2002 | Allen |
| 2002/0140680 | A1 | 10/2002 | Lu |
| 2002/0169017 | A1 | 11/2002 | Visoenik |
| 2002/0185981 | A1 | 12/2002 | Dietz et al. |
| 2003/0004871 | A1 | 1/2003 | Rowe |
| 2003/0020733 | A1 | 1/2003 | Yin |
| 2003/0094752 | A1 | 5/2003 | Mathews |
| 2003/0144053 | A1 | 7/2003 | Michaelson |
| 2004/0053661 | A1 | 3/2004 | Jones et al. |
| 2004/0063492 | A1 | 4/2004 | Baerlocher et al. |
| 2004/0127284 | A1 | 7/2004 | Walker et al. |
| 2004/0159590 | A1 | 8/2004 | Mothwurf |
| 2004/0166937 | A1 | 8/2004 | Rothschild |
| 2004/0171416 | A1 | 9/2004 | Baerlocher et al. |
| 2004/0198484 | A1 | 10/2004 | Johnson |
| 2004/0204218 | A1 | 10/2004 | Hughs-Baird |
| 2005/0009600 | A1 | 1/2005 | Rowe et al. |
| 2005/0032568 | A1 | 2/2005 | Griswold et al. |
| 2005/0054429 | A1 | 3/2005 | Baerlocher et al. |
| 2005/0060050 | A1 | 3/2005 | Baerlocher |
| 2005/0119043 | A1 | 6/2005 | Berman et al. |
| 2005/0162402 | A1 | 7/2005 | Watanachote |
| 2005/0164759 | A1 | 7/2005 | Smith et al. |
| 2005/0178074 | A1 | 8/2005 | Kerosetz |
| 2005/0215307 | A1 | 9/2005 | Jarvis et al. |
| 2005/0245302 | A1 | 11/2005 | Bathiche et al. |
| 2005/0251800 | A1 | 11/2005 | Kurlander et al. |

(56) References Cited

U.S. PATENT DOCUMENTS

| | | |
|---|---|---|
| 2005/0282625 A1 | 12/2005 | Nicely |
| 2005/0282626 A1* | 12/2005 | Manfredi ............ A63F 3/00157 463/25 |
| 2006/0022956 A1 | 2/2006 | Lengeling et al. |
| 2006/0026521 A1 | 2/2006 | Hotelling et al. |
| 2006/0030394 A1 | 2/2006 | Crivelli et al. |
| 2006/0030959 A1 | 2/2006 | Duhamel |
| 2006/0030960 A1 | 2/2006 | Duhamel et al. |
| 2006/0032680 A1 | 2/2006 | Elias et al. |
| 2006/0036874 A1 | 2/2006 | Cockerille et al. |
| 2006/0046821 A1 | 3/2006 | Kaminkow et al. |
| 2006/0046849 A1 | 3/2006 | Kovacs et al. |
| 2006/0052885 A1 | 3/2006 | Kong |
| 2006/0058088 A1 | 3/2006 | Crawford, III et al. |
| 2006/0066564 A1 | 3/2006 | Yee et al. |
| 2006/0068864 A1 | 3/2006 | White et al. |
| 2006/0068870 A1 | 3/2006 | Crawford, III et al. |
| 2006/0086896 A1 | 4/2006 | Han |
| 2006/0097991 A1 | 5/2006 | Hotelling et al. |
| 2006/0125803 A1 | 6/2006 | Westerman et al. |
| 2006/0128457 A1 | 6/2006 | Cannon |
| 2006/0135238 A1 | 6/2006 | Lancaster et al. |
| 2006/0148565 A1 | 7/2006 | Gauselmann et al. |
| 2006/0157928 A1 | 7/2006 | O'Halloran |
| 2006/0163807 A1 | 7/2006 | Crenshaw et al. |
| 2006/0170154 A1 | 8/2006 | Matsuno et al. |
| 2006/0170155 A1 | 8/2006 | Silverman |
| 2006/0197750 A1 | 9/2006 | Kerr et al. |
| 2006/0197753 A1 | 9/2006 | Hotelling |
| 2006/0237905 A1 | 10/2006 | Nicely et al. |
| 2006/0238517 A1 | 10/2006 | King et al. |
| 2006/0238518 A1 | 10/2006 | Westerman et al. |
| 2006/0238519 A1 | 10/2006 | Westerman et al. |
| 2006/0238520 A1 | 10/2006 | Westerman et al. |
| 2006/0238521 A1 | 10/2006 | Westerman et al. |
| 2006/0238522 A1 | 10/2006 | Westerman et al. |
| 2006/0240887 A1 | 10/2006 | Walker et al. |
| 2006/0249899 A1 | 11/2006 | Lease |
| 2006/0284874 A1 | 12/2006 | Wilson |
| 2006/0287053 A1 | 12/2006 | Yokota |
| 2007/0054726 A1 | 3/2007 | Muir et al. |
| 2007/0060321 A1 | 3/2007 | Vasquez et al. |
| 2007/0069459 A1 | 3/2007 | Vidondo |
| 2007/0070050 A1 | 3/2007 | Westerman et al. |
| 2007/0070051 A1 | 3/2007 | Westerman et al. |
| 2007/0070052 A1 | 3/2007 | Westerman et al. |
| 2007/0075488 A1 | 4/2007 | Pececnik |
| 2007/0077987 A1 | 4/2007 | Gururajan et al. |
| 2007/0078919 A1 | 4/2007 | Westerman et al. |
| 2007/0081726 A1 | 4/2007 | Westerman et al. |
| 2007/0087843 A1 | 4/2007 | Steil et al. |
| 2007/0120320 A1 | 5/2007 | Miltenberger et al. |
| 2007/0135203 A1 | 6/2007 | Nicely |
| 2007/0135204 A1 | 6/2007 | Nicely |
| 2007/0139395 A1 | 6/2007 | Westerman et al. |
| 2007/0146336 A1 | 6/2007 | Ording et al. |
| 2007/0152980 A1 | 7/2007 | Kociendae et al. |
| 2007/0152984 A1 | 7/2007 | Ording et al. |
| 2007/0155464 A1 | 7/2007 | Baerlocher |
| 2007/0155481 A1 | 7/2007 | Vancura et al. |
| 2007/0157089 A1 | 7/2007 | Van Os et al. |
| 2007/0167206 A1 | 7/2007 | Kirkutis |
| 2007/0177803 A1 | 8/2007 | Elias et al. |
| 2007/0177804 A1 | 8/2007 | Elias et al. |
| 2007/0188444 A1 | 8/2007 | Vale et al. |
| 2007/0192550 A1 | 8/2007 | Rodeheffer et al. |
| 2007/0213119 A1 | 9/2007 | Baerlocher et al. |
| 2008/0020815 A1 | 1/2008 | Lancaster et al. |
| 2008/0059372 A1* | 3/2008 | Lee ...................... G06Q 20/105 705/41 |
| 2008/0070674 A1 | 3/2008 | Lancaster et al. |
| 2008/0076500 A1 | 3/2008 | Lancaster et al. |
| 2008/0076506 A1 | 3/2008 | Nguyen et al. |
| 2008/0076581 A1 | 3/2008 | Mattice et al. |
| 2008/0085769 A1 | 4/2008 | Lutnick et al. |
| 2008/0102934 A1 | 5/2008 | Tan |
| 2008/0108406 A1 | 5/2008 | Oberberger |
| 2008/0108425 A1 | 5/2008 | Oberberger |
| 2008/0113759 A1 | 5/2008 | Baerlocher |
| 2008/0122803 A1 | 5/2008 | Izadi et al. |
| 2008/0132320 A1 | 6/2008 | Rodgers |
| 2008/0182650 A1 | 7/2008 | Randall et al. |
| 2008/0182655 A1 | 7/2008 | DeWaal et al. |
| 2008/0194316 A1 | 8/2008 | Baerlocher |
| 2008/0214280 A1 | 9/2008 | Baerlocher |
| 2008/0318668 A1 | 12/2008 | Ching et al. |
| 2009/0084612 A1 | 4/2009 | Mattice et al. |
| 2009/0094515 A1 | 4/2009 | Do et al. |
| 2009/0098925 A1* | 4/2009 | Gagner .................. G07F 17/32 463/20 |
| 2009/0111573 A1 | 4/2009 | Iddings |
| 2009/0117994 A1 | 5/2009 | Kelly et al. |
| 2009/0118005 A1 | 5/2009 | Kelly et al. |
| 2009/0124379 A1 | 5/2009 | Wells |
| 2009/0124383 A1 | 5/2009 | Gadda et al. |
| 2009/0143141 A1 | 6/2009 | Wells et al. |
| 2009/0325686 A1 | 12/2009 | Davis et al. |
| 2010/0087241 A1 | 4/2010 | Nguyen et al. |
| 2010/0130280 A1 | 5/2010 | Arezina et al. |
| 2011/0065513 A1 | 3/2011 | Nordahl et al. |

FOREIGN PATENT DOCUMENTS

| | | |
|---|---|---|
| EP | 1671684 | 6/2006 |
| EP | 1710000 | 10/2006 |
| EP | 1721642 | 11/2006 |
| EP | 1736215 | 12/2006 |
| EP | 1769828 | 4/2007 |
| GB | 2358591 | 8/2001 |
| GB | 2395139 | 5/2004 |
| GB | 2431362 | 4/2007 |
| JP | 2005-211384 A | 8/2005 |
| NZ | 0521900 | 8/1996 |
| WO | WO 96/25208 | 8/1996 |
| WO | WO 97/38766 | 10/1997 |
| WO | WO 2000/33269 | 6/2000 |
| WO | WO 01/86604 | 11/2001 |
| WO | WO 03/025867 | 3/2003 |
| WO | WO 2006/015442 | 2/2006 |
| WO | WO 2006/061616 | 6/2006 |
| WO | WO 2006/078219 | 7/2006 |
| WO | WO 2006/094398 | 9/2006 |
| WO | WO 2006/097007 | 9/2006 |
| WO | WO 2007/024202 | 3/2007 |
| WO | WO 2007/033430 | 3/2007 |
| WO | WO 2007/077449 | 7/2007 |
| WO | WO 2008/039174 | 4/2008 |
| WO | WO 2008/039835 | 4/2008 |
| WO | WO 2008/045464 | 4/2008 |
| WO | WO 2008/103928 | 8/2008 |

OTHER PUBLICATIONS

PCT International Search Report and Written Opinion dated Feb. 10, 2010 issued in PCT/US2009/056812.

* cited by examiner

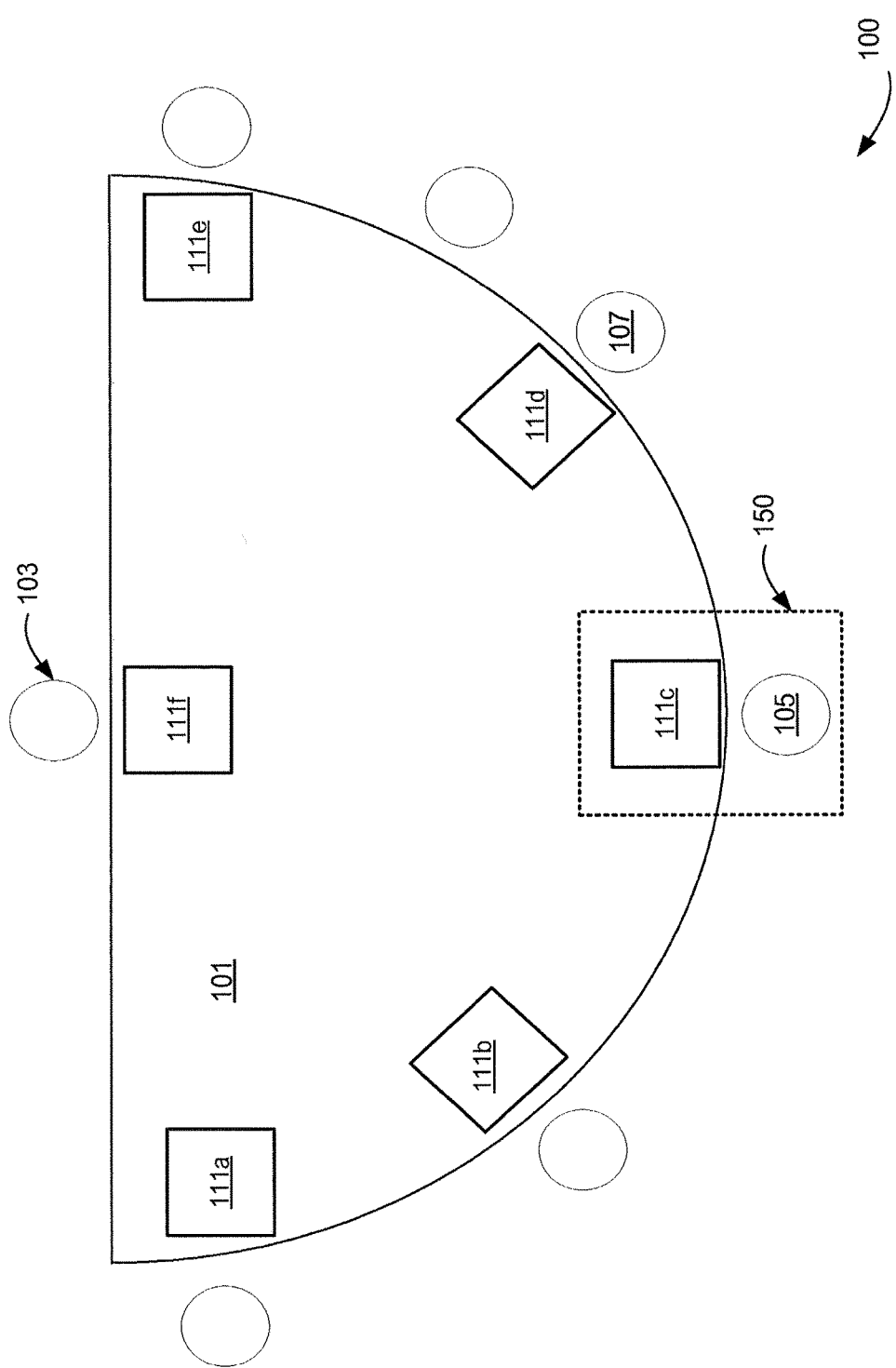

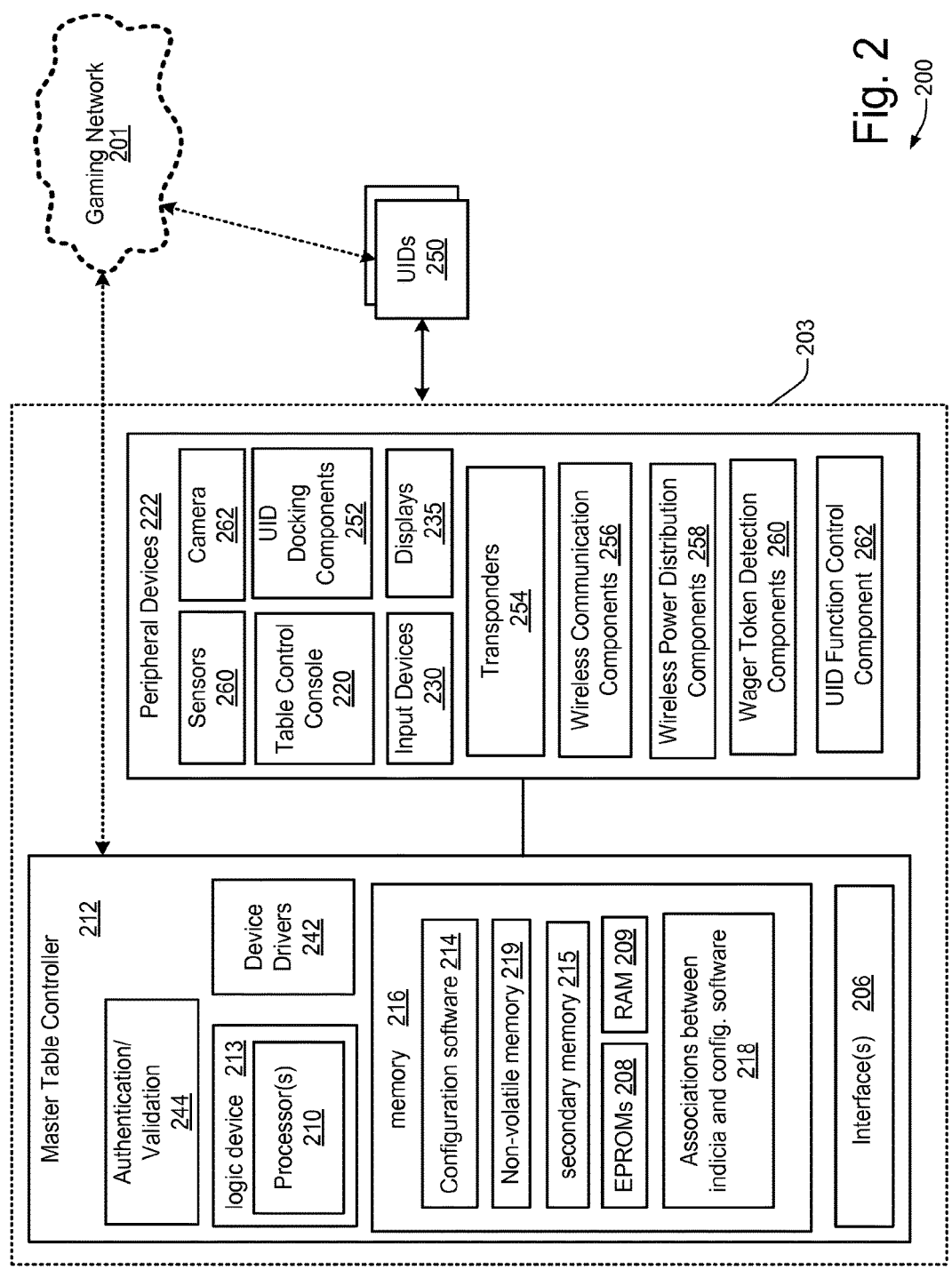

GAMING SYSTEM INCLUDING A GAMING TABLE AND A PLURALITY OF USER INPUT DEVICES

PRIORITY CLAIM

This application is a continuation of and claims priority to and the benefit of U.S. patent application Ser. No. 14/834,056, which was filed on Aug. 24, 2015, which is a continuation of and claims priority to and the benefit of U.S. patent application Ser. No. 14/022,084, which was filed on Sep. 9, 2013, and issued as U.S. Pat. No. 9,129,473 on Sep. 8, 2015, which is a continuation of and claims priority to and the benefit of U.S. patent application Ser. No. 12/244,725, which was filed on Oct. 2, 2008, and issued as U.S. Pat. No. 8,529,345 on Sep. 10, 2013, the entire contents of each of which are incorporated herein by reference.

BACKGROUND

Aspect of the present disclosure relate to gaming machines such as slot machines and video poker machines. More particularly, the present invention relates to personalized multiplayer table touch interfaces for use with casino gaming table activities.

In computer (or computing) science, input/output (or I/O) can refer to a collection of interfaces that different functional units (sub-systems) of an information processing system use to communicate with each other. In general, input can be a signal received by a functional unit, and output can be a signals sent from the functional unit.

Input/output (I/O) devices can be used by a person (or other system) to communicate with a computer. For instance, keyboards and mouses are considered input devices of a computer and monitors and printers are considered output devices of a computer. Typically, devices used for communication between computers are for both input and output (e.g., modems and network cards).

Some input devices (e.g., mouses and keyboards) can receive as input the physical movement provided by a human being and convert it into signals that a computer can understand. The output from these devices is treated as input by the computer. Similarly, printers and monitors take as input signals that a computer outputs and convert them into representations that human users can see or read (the process of reading or seeing the representations can be considered as receiving input.)

Generally, an input device can be considered an interface between a user (e.g., human being, application program) and a machine. The input device's primary function is to receive input from the user and translate it for the machine. A few examples of Input devices are keyboards, mouses, touchpads, touchscreens, trackballs and tablets. Input devices are prevalent in gaming environments. Joysticks, gamepads, power pads and analog sticks are examples of input devices that are often used in gaming environments.

Some devices can effectively provide both input and output. As an example, conventional touchscreens (touchscreens, touch panels or touchscreen panels) are display overlays which have the ability to display and receive information on the same screen. The effect of such overlays allows a display to be used as an input device, removing the keyboard and/or the mouse as the primary input device for interacting with the display's content. Such displays can be attached to computers or, as terminals, to networks. Touchscreens also have assisted in recent changes in the PDA and cell-phone industries, making these devices more usable.

Touchscreens have become commonplace since the invention of the electronic touch interface in 1971 by Dr. Samuel C. Hurst. They have become familiar in retail settings, on point of sale systems, on ATMs and on PDAs where a stylus is sometimes used to manipulate the GUI and to enter data.

More recently, "multi-touching" techniques have been developed. Generally, "multi-touch" can refer to a human-computer interaction technique and the hardware devices that implement it. For example, it can refer to a touchscreen (or touch tablet/touchpad) that recognizes multiple simultaneous touch points. The multi-touch screen can be configured to detect the pressure or degree of each touch independently, as well as detecting their individual position. This allows gestures and interaction with multiple fingers or hands, chording, and can provide rich interaction, including direct manipulation, through intuitive gestures. Depending largely on their size, some multi-touch devices support more than one user on the same device simultaneously. Touchscreens (touchscreens, touch panels or touchscreen panels) are display overlays which have the ability to display and receive information on the same screen. The effect of such overlays allows a display to be used as an input device, removing the keyboard and/or the mouse as the primary input device for interacting with the display's content. Such displays can be attached to computers or, as terminals, to networks. Touchscreens also have assisted in recent changes in the PDA and Cell-Phone Industries, making these devices even more usable.

As noted above, input devices, among other places, are prevalent in gaming environments. As such, a modern gaming machine will be discussed. As such, a modern gaming machine is discussed further.

Typically, a gaming machine utilizes a master controller to effectively control various combinations of devices that allow a player to play a game on the gaming machine and also encourage game play on the gaming machine. A game played on a gaming machine usually requires a player to input money or indicia of credit into the gaming machine, indicate a wager amount, and initiate playing a game of chance. These steps often require the gaming machine to control input devices, such as bill validators and coin acceptors, to accept money into the gaming machine and recognize user inputs from devices, including key pads, button pads, card readers, and ticket readers, to determine the wager amount, and initiate game play. After game play has been initiated, the gaming machine determines the outcome of the game, presents the game outcome to the player, and may dispense an award of some type depending on the outcome of the game. The operations described above may be carried out on the gaming machine when the gaming machine is operating as a "stand alone" unit and/or linked in a network of some type to a group of gaming machines.

As technology in the gaming industry progresses, more and more gaming services are being provided to gaming machines via communication networks that link groups of gaming machines to a remote computer, such as a host server, that provides one or more gaming services. As an example, gaming services that may be provided by a remote computer to a gaming machine via a communication network of some type include player tracking, accounting, cashless award ticketing, lottery, progressive games, and bonus games or prizes. These services and features are provided in addition to the games that are available for play on the gaming machines.

SUMMARY

Various aspects are directed to different methods, systems, and computer program products for operating a wager-based gaming system in a casino gaming network. In at least one embodiment, the wager-based gaming system may include a gaming table system. In at least one embodiment, the gaming table system may include a gaming table including a gaming table surface, a gaming controller, memory, and at least one interface for communicating with at least one other device in the gaming network. In at least one embodiment, the wager-based gaming system may include a first handheld device operable to communicate with the gaming controller. In at least one embodiment, the first handheld device may include a first input interface operable to acquire information relating to a first portion of content which is displayed at the gaming table surface. In at least one embodiment, the first handheld device may be operable to provide a first portion of the acquired information to the gaming table system. In at least one embodiment, the gaming table system may be operable to: control a wager-based game played at the gaming system; receive the first portion of acquired information from the first handheld device; determine, using the first portion of acquired information, a first portion of input instructions; associate the first portion of input instructions with a first player at the gaming table; identify at least one first action to be initiated on behalf of the first player for implementing the first portion of input instructions; and initiate the at least one first action.

In at least one embodiment, the gaming table surface may include a first common wagering region which is configured or designed to be concurrently accessible to multiple different players for placing one or more wagers at one or more locations of the common wagering region. In at least one embodiment, the first portion of input instructions may include wager-related information. Additionally, in at least one embodiment, The gaming table system may further be operable to: process a first contact event record including a first portion of event information relating to an occurrence of a first contact between the first handheld device and the gaming table surface at a first location of the common wagering region; and determine, using the wager-related information and the first portion of event information, instructions for placing a wager on behalf of the first player at a the first location of the common wagering region. In at least one embodiment, the at least one first action may include electronically placing the first wager on behalf of the first player, the first wager being associated with the first location of the common wagering region.

Other aspects are directed to different methods, systems, and computer program products for operating a wager-based gaming system in a casino gaming network. In at least one embodiment, a first handheld device may be operated to acquire information relating to a first portion of content which is displayed at a surface of a gaming table which is part of a gaming table system. A first portion of the acquired information may be provided to the gaming table system. Using the first portion of acquired information, a first portion of input instructions may be automatically determined. The first portion of input instructions may be associated with a first player at the gaming table. At least one first action may be identified to be initiated on behalf of the first player for implementing the first portion of input instructions.

Other aspects are directed to different methods, systems, and computer program products for operating wireless handheld device comprising a controller, memory, and at least one interface for communicating with a wager-based gaming system. In at least one embodiment, the handheld device is configured or designed to: detect an occurrence of a first contact event relating to a first contact between the handheld device and a first region of the gaming system; acquire first wager-related information relating to a first portion of content displayed at a first region of the gaming system; generate a first contact event record which includes first event information relating to the first contact event and the first wager-related information; detect an occurrence of a second contact event relating to a second contact between the handheld device and a second region of the gaming system; acquire second wager-related information relating to a second portion of content displayed at a second region of the gaming system; and generate a second contact event record which includes second event information relating to the second contact event and the second wager-related information.

Additional objects, features and advantages of the various aspects of the present invention will become apparent from the following description of its preferred embodiments, which description should be taken in conjunction with the accompanying drawings.

BRIEF DESCRIPTION OF THE FIGURES

FIGS. 1A-B show example embodiments of gaming table systems and portions thereof.

FIG. 2 is a simplified block diagram of an example intelligent gaming table 200 in accordance with a specific embodiment.

DETAILED DESCRIPTION

Figure 1B:
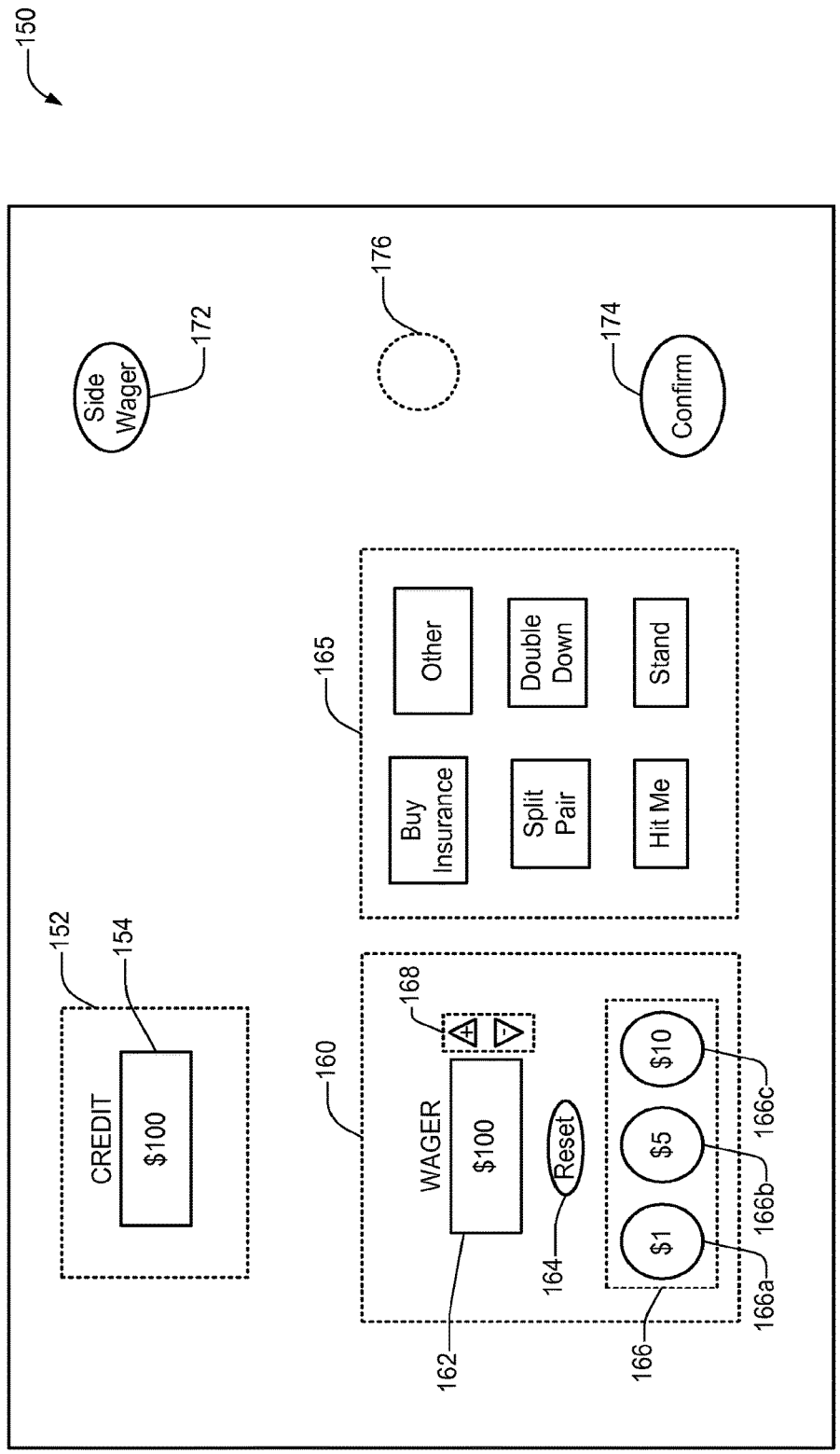

Various embodiments are described herein with reference to the accompanying drawings. In the following description, numerous specific details are set forth in order to provide a thorough understanding one or more embodiments described herein. It will be apparent, however, to one skilled in the art, that other embodiments may be practiced without some or all of these specific details. In other instances, well known process steps and/or structures have not been described in detail, for example, in order to not obscure the various details relating to one or more embodiments.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

Various techniques and mechanisms described herein may sometimes be described in singular form for clarity. However, it should be noted that particular embodiments include multiple iterations of a technique or multiple instantiations of a mechanism unless noted otherwise.

One aspect of at least some embodiments disclosed herein relates to processing input for wager-based gaming systems. For example, one embodiment relates to input systems and input processing techniques for serving multiple users via a common input surface (input area) or input device. In accordance with one embodiment, one or more separate input detection systems can be provided. For example, in at least one embodiment, one or more wager-based gaming systems may include an input detection system which is operable to detect the identity of a particular user who has provided input to a common input region (e.g., a common input device, location, area, surface) which is concurrently accessible to multiple users. In one embodiment, the user-identifier mechanism may be used to determine which one of the users has provided (e.g., entered) input at the common input region. In at least one embodiment, the input detection system may include an input-locator mechanism that is operable to detect the location of input by anyone of the users.

In at least one embodiment, the input detection system may be configured to communicate with a synchronizer/controller system and to provide it with the identity of the user and/or the location(s) of the user's contact(s) with the common input region. In one embodiment, the synchronizer/controller may be operable to determine whether it is likely that the particular player has provided input at or associated with given location of the common input region. It will also be appreciated that input entered by a non-user can be effectively ignored. In addition, a constant touch on the same location and/or multiple touches by the same user at the same location can be detected and processed accordingly.

FIG. 1A shows an example of a specific embodiment of an intelligent gaming table which may be used for implementing various aspects in accordance with one or more embodiments. As illustrated in the example of FIG. 1A, a casino gaming table environment 100 is illustrated which includes intelligent gaming table 101, casino attendant (e.g., dealer) station 103, and player stations (e.g., 105, 107). In at least one embodiment, the intelligent gaming table 101 may include a plurality of electronic displays (e.g., within player station regions 111a-e and/or dealer region 111f). In one embodiment, the plurality of electronic displays may be implemented as separate physical displays which have been mounted on top or into (or onto) the body of a conventional-type casino gaming table. In an alternate embodiment, the entire top surface (or selected portions thereof) of the intelligent gaming table may be implemented as a continuous display, and regions 111a-f may be implemented as specific display regions within the continuous display. Other embodiments of the intelligent gaming table in accordance with one or more embodiments may resemble conventional-type casino gaming tables (e.g., felt-top type gaming tables) which do not include any electronic displays.

According to specific embodiments, the intelligent gaming table 101 can be of a variety of common constructions. For example, table 101 may include a table support trestle having legs which contact an underlying floor to support the intelligent gaming table thereon. The intelligent gaming table may have a table top and perimeter pad which extends fully about a semicircular portion of the table periphery. The straight, back portion of the periphery is used by the dealer 103 and can be partly or wholly padded as may vary with the particular table chosen. In the example of FIG. 1A, the semicircular or "D-shape" gaming table surface top shape is particularly well-suited for use with various types of wager-based table games such as, for example, blackjack, baccarat, etc. However, other embodiments of intelligent gaming table systems contemplated herein may include various different types of shape configurations (e.g., circular, oval, square, rectangular, C-shaped, etc.), which may be preferable and/or suitable for different types of casino table games (e.g., such as, for example, roulette, craps, etc.)

In one embodiment, a playing surface is provided upon the upwardly facing surface of table top upon which participants of the table game play. For example, in one embodiment, a plurality of players (e.g., players at stations 105, 107) sit or stand along the semicircular portion and play a desired card game, such as the popular casino card game of blackjack. According to other embodiments, other table games are alternatively possible such as, for example, craps, poker, baccarat, roulette, pai gow, sic bo, fantan, etc.

In at least one embodiment, table 101 can support a system, or form a part of a system for playing wager-based table games which is constructed in accordance with one or more embodiments.

According to specific embodiments, the intelligent gaming table may include a plurality of electronic displays. In one embodiment, the plurality of electronic displays may be implemented as separate physical displays which have been mounted into (or onto) the body of a conventional-type casino gaming table. In an alternate embodiment, the entire top surface (or selected portions thereof) of the intelligent gaming table may be implemented as a continuous display. Other embodiments of the intelligent gaming table in accordance with one or more embodiments may resemble conventional-type casino gaming tables which do not include any electronic displays.

According to a specific embodiment, one or more of the electronic displays may form part of a presentation system which, for example, may be supported upon the upper or playing surface of the intelligent gaming table. This allows the system to be easily installed upon a variety of differing intelligent gaming tables without extensive modifications being performed. Alternatively, the presentation system can otherwise be mounted upon the intelligent gaming table in a manner which allows participants to view one or more of the displays which form a part of the presentation system.

According to a specific embodiment, the presentation system may be adapted for use by a dealer (e.g., at 103) and multiple players (e.g. at 105, 107, etc.) who are in attendance and positioned about the intelligent gaming table.

In at least one embodiment, the intelligent gaming table may optionally include a plurality of electronic displays (e.g., within player regions 111*a*-*e*), herein termed player displays, which are capable of displaying changeable display content including, for example, text and/or graphical images. In at least one embodiment, each player display may be operable to display graphical representation representing game play information, wagering information, and/or bonus information associated with one or more players at the intelligent gaming table.

Additionally, in at least one embodiment, the intelligent gaming table may include one or more common displays which may present information for the exclusive use of a casino host/dealer and/or other information to be viewed by the dealer, players, spectators, and/or other persons. Various types of information which may be displayed at the common display include, for example: dealer cards, ante information, common or shared player cards, individual player cards, wager information, etc.

In at least one embodiment, the player displays may be arranged adjacent to each player seating position. For example, region 111*c* of FIG. 1A may include at least one player display for use by a player at position 105.

In at least one embodiment, the intelligent gaming table displays may include touchscreen functionality for facilitating user interaction. For example, the player displays may include a touchscreen and/or other input mechanisms for allowing the player to provide input relating to game play, preferences, wagering, player tracking activity, etc.

In at least one implementation, the intelligent gaming table may include one or more sensors or other security mechanisms which, for example, may be used for a variety of purposes such as, for example, controlling the display of a player's cards; preventing accidental exposure of player cards; providing additional security features with respect to information displayed on the player's display; etc.

Although not shown in the example of FIG. 1A, the intelligent gaming table 101 may also include, one or more of the following (or combinations thereof):

A wager token tray which allows the dealer to conveniently store betting chips used by the dealer in playing the game.

A money drop slot may be further included to allow the dealer to easily deposit paper money bills thereinto when players purchase betting chips;

A table control console for use by the dealer and/or other casino employees. In one implementation, the table control console may be used to facilitate and execute game play operations, table configuration operations, player tracking operations, maintenance and inspection operations, etc.

One or more common displays which may be operable to present information for the exclusive use of the dealer and/or other information to be viewed by the dealer, players, spectators, and/or other persons. Various types of information which may be displayed at the common display 110 include, for example: dealer cards, ante information, common or shared player cards, individual player cards, wager information, etc.

One or more speakers which, for example, may be used to provide various types of audio information such as, for example: game related information (e.g., instructions to players and/or dealer, sound effects, etc.), casino related announcements, gaming table status information, music, attracts, promotions, bonus information, communication information (e.g., for speakerphone or two-way radio communications), etc.

One aspect of at least some embodiments disclosed herein relates to processing input relating to gaming table systems, particularly live casino gaming table systems such as those typically located on the floor of a casino establishment (e.g., in which live players are physically present at a physical gaming table, and engage in wager-based gaming activities at the gaming table). For example, one embodiment relates to input systems and input processing techniques for serving multiple users (e.g., players, hosts, etc.) via a common input surface (input area) and/or one or more input device(s).

In accordance with one embodiment, one or more input detection systems can be provided. For example, in at least one embodiment, an intelligent, live casino gaming table may include an input detection system having various types of features/functionalities such as, for example, one or more of the following (or combinations thereof): a user-identifier functionality for detecting or determining the identity of a particular user who has provided input to a common area of the gaming table which is accessible to multiple users; an input-locator functionality for concurrently detecting the respective locations of multiple different input events associated with input data provided from different users at the gaming table; etc.

In one embodiment, the user-identifier mechanism(s) may be operable to function in a multi-player environment, and may include, for example, functionality for: concurrently detecting multiple different input data from different players at the gaming table; determining a unique identifier for each active player at the gaming table; automatically determining, for each input detected, the identity of the player (or other person) who provided that input; and/or automatically associating each detected input with an identifier representing the player (or other person) who provided that input.

Typically, presently existing casino gaming table systems which employ the use of electronic touch systems (such as touchscreens) are not able to uniquely determine the individual identities of multiple individuals (e.g., players) who might touch a particular touchscreen at the same time. Additionally, such gaming table systems typically cannot resolve which transactions are being carried out by each of the individual players accessing the multi-touch display system. This limits the usefulness of touch-type interfaces in multi-player applications such as table games.

Casino table games popular with players, and represent an important revenue stream to casino operators. However, gaming table manufacturers have so far been unsuccessful in employing the use large touch screen displays to recreate the feel and play associated with most conventional (e.g., non-electronic and/or felt-top) casino table games.

Accordingly, one aspect of the least one embodiment disclosed herein is directed to a system whereby a live gaming table system is provided with one or more handheld user input devices which, for example, may allow multiple different players to simultaneously or concurrently provide wager input data and/or other data to the gaming table system. For example, in one embodiment, players can, for example, touch a stack of virtual chips and then touch an area on the table to drop those chips at that position. Because the system uniquely identifies each player, multiple players can interact with the touch surface at the same time and the table will correctly register the individual bets and correctly associate each that with the proper player who placed the bet.

In at least one embodiment, a multi-player table gaming system may include multi-player touch input interface system which is operable to identify or determine where, who, and what transactions are taking place at the gaming table. Additionally, in at least one embodiment, an electronic gaming table system may be provided which mimics the look, feel, and game play aspects of traditional gaming tables.

As disclosed herein, the phrase "intelligent gaming table" may be used to represent or characterize one or more embodiments of gaming table systems described or referenced herein.

According to different embodiments, the gaming table system may track and/or record various types of input data such as, for example, one or more of the following (or combinations thereof):

locations of user touches/contacts at the table surface;
identification of the user(s) performing the input/touch action(s);
amounts wagered;
timestamp information;
etc.

Existing touch screen-type displays use one or more of several methods to determine where the screen is being touched. These methods may include such technologies as capacitive sensing, resistive sensing, magnetic sensing, and the like. While such existing methods may be generally suitable for detecting the position of the area being touched, they lack the ability to uniquely identify multiple concurrent touches and properly associate each touch with a particular individual.

In at least one embodiment, the input detection system may be operable to uniquely identify precisely where different players touch the gaming table even, if multiple players touch the table simultaneously. Additionally, in at least one embodiment, the input detection system may be operable to allow several different positions and transactions to be automatically determined and tracked independently and accurately.

In at least one embodiment, the input detection system may include one or more handheld user input devices (UIDs) which, for example, may be used to facilitate electronic input of user data (e.g., game play input, wagering input, etc.) at various types of gaming tables, including traditional felt-top casino gaming tables.

FIG. 2 is a simplified block diagram of an example intelligent gaming table 200 in accordance with a specific embodiment. As illustrated in the embodiment of FIG. 2, intelligent gaming table 200 includes at least one processor 210, at least one interface 206, and memory 216.

In one implementation, processor 210 and master table controller 212 are included in a logic device 213 enclosed in a logic device housing. The processor 210 may include any conventional processor or logic device configured to execute software allowing various configuration and reconfiguration tasks such as, for example, one or more of the following (or combinations thereof): a) communicating with a remote source via communication interface 206, such as a server that stores authentication information or games; b) converting signals read by an interface to a format corresponding to that used by software or memory in the intelligent gaming table; c) accessing memory to configure or reconfigure game parameters in the memory according to indicia read from the device; d) communicating with interfaces, various peripheral devices 222 and/or I/O devices; e) operating peripheral devices 222 such as, for example, card readers, paper ticket readers, etc.; f) operating various I/O devices such as, for example, displays 235, input devices 230; etc. For instance, the processor 210 may send messages including game play information to the displays 235 to inform players of cards dealt, wagering information, and/or other desired information.

Peripheral devices 222 may include several device interfaces such as, for example: transponders 254, wire/wireless power distribution components (258), UID docking components (252), wireless communication components (256), player tracking devices, card readers, bill validator/paper ticket readers, etc. Such devices may each comprise resources for handling and processing configuration indicia such as a microcontroller that converts voltage levels for one or more scanning devices to signals provided to processor 210. In one embodiment, application software for interfacing with peripheral devices 222 may store instructions (such as, for example, how to read indicia from a portable device) in a memory device such as, for example, non-volatile memory, hard drive or a flash memory.

In at least one implementation, the intelligent gaming table may include card readers such as used with credit cards, or other identification code reading devices to allow or require player identification in connection with play of the card game and associated recording of game action. Such a user identification interface can be implemented in the form of a variety of magnetic card readers commercially available for reading a user-specific identification information. The user-specific information can be provided on specially constructed magnetic cards issued by a casino, or magnetically coded credit cards or debit cards frequently used with national credit organizations such as VISA, MASTERCARD, AMERICAN EXPRESS, or banks and other institutions.

The intelligent gaming table may include other types of participant identification mechanisms which may use a fingerprint image, eye blood vessel image reader, or other suitable biological information to confirm identity of the user. Still further it is possible to provide such participant identification information by having the dealer manually code in the information in response to the player indicating his or her code name or real name. Such additional identification could also be used to confirm credit use of a smart card, transponder, and/or player's UID.

The intelligent gaming table 200 also includes memory 216 which may include, for example, one or more of the following (or combinations thereof): volatile memory (e.g., RAM 209), non-volatile memory 219 (e.g., disk memory, FLASH memory, EPROMs, etc.), unalterable memory (e.g., EPROMs 208), etc. The memory may be configured or designed to store, for example: 1) configuration software 214 such as all the parameters and settings for a game playable on the intelligent gaming table; 2) associations 218 between configuration indicia read from a device with one or more parameters and settings; 3) communication protocols allowing the processor 210 to communicate with peripheral devices 222 and I/O devices 211; 4) a secondary memory storage device 215 such as a non-volatile memory device, configured to store gaming software related information (the gaming software related information and memory may be used to store various audio files and games not currently being used and invoked in a configuration or reconfiguration); 5) communication transport protocols (such as, for example, TCP/IP, USB, Firewire, IEEE1394, Bluetooth, IEEE 802.11x (IEEE 802.11 standards), hiperlan/2, HomeRF, etc.) for allowing the intelligent gaming table to communicate with local and non-local devices using such protocols; etc. In one implementation, the master table controller 212 communicates using a serial communication protocol. A few examples of serial communication protocols that may be used to communicate with the master table controller include but are not limited to USB, RS-232 and Netplex (a proprietary protocol developed by IGT, Reno, Nev.).

A plurality of device drivers 242 may be stored in memory 216. Example of different types of device drivers may include device drivers for intelligent gaming table components, device drivers for peripheral components 222, etc. Typically, the device drivers 242 utilize a communication protocol of some type that enables communication with a particular physical device. The device driver abstracts the hardware implementation of a device. For example, a device drive may be written for each type of card reader that may be potentially connected to the intelligent gaming table. Examples of communication protocols used to implement the device drivers include, for example, Netplex, USB, Serial, Ethernet 275, Firewire, I/O debouncer, direct memory map, serial, PCT, parallel, RF, Bluetooth™, near-field communications (e.g., using near-field magnetics), 802.11 (WiFi), etc. Netplex is a proprietary IGT standard while the others are open standards. According to a specific embodiment, when one type of a particular device is exchanged for another type of the particular device, a new device driver may be loaded from the memory 216 by the processor 210 to allow communication with the device. For instance, one type of card reader in intelligent gaming table 200 may be replaced with a second type of card reader where device drivers for both card readers are stored in the memory 216.

In some embodiments, the software units stored in the memory 216 may be upgraded as needed. For instance, when the memory 216 is a hard drive, new games, game options, various new parameters, new settings for existing parameters, new settings for new parameters, device drivers, and new communication protocols may be uploaded to the memory from the master table controller 212 or from some other external device. As another example, when the memory 216 includes a CD/DVD drive including a CD/DVD designed or configured to store game options, parameters, and settings, the software stored in the memory may be upgraded by replacing a first CD/DVD with a second CD/DVD. In yet another example, when the memory 216 uses one or more flash memory 219 or EPROM 208 units designed or configured to store games, game options, parameters, settings, the software stored in the flash and/or EPROM memory units may be upgraded by replacing one or more memory units with new memory units which include the upgraded software. In another embodiment, one or more of the memory devices, such as the hard-drive, may be employed in a game software download process from a remote software server.

In some embodiments, the intelligent gaming table 200 may also include various authentication and/or validation components 244 which may be used for authenticating/validating specified intelligent gaming table components such as, for example, hardware components, software components, firmware components, information stored in the intelligent gaming table memory 216, etc. Examples of various authentication and/or validation components are described in U.S. Pat. No. 6,620,047, entitled, "ELECTRONIC GAMING APPARATUS HAVING AUTHENTICATION DATA SETS," incorporated herein by reference in its entirety for all purposes.

Peripheral devices 222 may also include other devices/components such as, for example one or more of the following (or combinations thereof): sensors 260, cameras 262, control consoles 220, transponders 254, wireless communication components 256, wireless power distribution components 258, UID docking components 252, wager token detection components 260, UID function control components 262, etc.

Sensors 260 may include, for example, optical sensors, pressure sensors, RF sensors, Infrared sensors, image sensors, thermal sensors, biometric sensors, etc. As mentioned previously, such sensors may be used for a variety of functions such as, for example: detecting the presence and/or monetary amount of wager tokens which have been placed within a player's wagering zone; detecting the presence and/or identity of UIDs placed within a player's UID docking region; detecting contacts of one or more objects (e.g., human fingers, UIDs, wager tokens, etc.) with the gaming table surface; etc.

In one implementation, at least a portion of the sensors 260 and/or input devices 230 may be implemented in the form of touch keys selected from a wide variety of commercially available touch keys used to provide electrical control signals. Alternatively, some of the touch keys may be implemented in another form which are touch sensors such as those provided by a touchscreen display. For example, in at least one implementation, the intelligent gaming table player displays and/or UID displays may include input functionality for allowing players to provide their game play decisions/instructions (and/or other input) to the dealer using the touch keys and/or other player control sensors/buttons. Additionally, such input functionality may also be used for allowing players to provide input to other devices in the casino gaming network (such as, for example, player tracking systems, side wagering systems, etc.)

Wireless communication components 256 may include one or more communication interfaces having different architectures and utilizing a variety of protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetic communication protocols, etc. The communication links may transmit electrical, electromagnetic or optical signals which carry digital data streams or analog signals representing various types of information.

Wireless power distribution components 258 may include, for example, components or devices which are operable for providing or distributing wireless power to other devices. For example, in one implementation, the wireless power components 258 may include a magnetic induction system which is adapted to provide wireless power to one or more UIDs at the intelligent gaming table. In one implementation, a UID docking region may include a wireless power component which is able to recharge a UID placed within the UID docking region without requiring, for example, metal-to-metal contact.

According to a specific embodiment, Table Control Console 220 may be used to facilitate and execute game play operations, table configuration operations, player tracking operations, maintenance and inspection operations, etc. In one implementation, the Table Control Console 220 may include at least one display for displaying desired information, such as, for example, programming options which are available in setting up the system and customizing operational parameters to the desired settings for a particular casino or cardroom in which the system is being used. The Table Control Console 220 may also include a key operated switch which is used to control basic operation of the system and for placing the unit into a programming mode. The key operated switch can provide two levels of access authorization which restricts access by dealers to programming, or additional security requirements can be provided in the software which restricts programming changes to management personnel. Programming may be input in several different modes.

For example, in a specific embodiment where the intelligent gaming table is configured as a blackjack gaming table, programming can be provided using a touch screen display with varying options presented thereon and the programming personnel can set various operational and rules parameters, such as, for example: the shuffle mode, number of decks of cards used in the virtual card stack, options with regard to the portion of the stack which is used before the stack is cut, limits on the amounts which can be bet at a particular table, whether splits are accepted for play and to what degree, options concerning doubling down plays, whether the dealer hits or stands on soft 17, and other rules can be made variable dependent upon the particular form of the system programming used in the system, depending on the type of card game being played. Control keys may also be used in some forms of the invention to allow various menu options to be displayed and programming options to be selected using the control keys. Still further it is possible to attach an auxiliary keyboard (not shown) to the Table Control Console through a keyboard connection port. The auxiliary keyboard can then be used to more easily program the system, or be used in maintenance, diagnostic functions, etc.

According to specific embodiments, the Table Control Console 220 may also include a plurality of dealer operational controls provided in the form of dealer control sensors which, for example, may be implemented via electrical touch keys. The dealer control sensors may be used by the dealer to indicate that desired control functions should take place or further proceed. For example, different sensors may be used to implement a player's decision to: split his two similar cards and play them as two separate or split hands; double down; stand on the cards already dealt or assigned to that player; etc. Other sensors may be used to:

command shuffling and dealing of a new hands to the participants;
collect a player's cards;
show a player's cards;
verify UID data (e.g., verify operational status of a UID, verify data read by the UID, etc.);
deal new cards to selected players;
authenticate a player's UID;
activate a UID;
replace a player's UID with an alternate UID;
call security;
request cocktail service;
recall previous game play data;
control display of multimedia content;
enable/disable UIDs;
etc.

It will be appreciated that other functions may be attributed to other keys or input sensors of various types. For example, in one implementation, at least a portion of the Table Control Console touch keys can be assigned to implement additional functions, such as in changeable soft key assignments during the programming or setup of the system.

According to specific embodiments, the wager token detection component 260 may be adapted to automatically detect the presence and/or monetary amount of wager tokens which have been placed at one or more specified regions of the gaming table surface. In one implementation, each wager token detection component 260 includes one or more wager token sensors which are immediately below or otherwise adjacent to a respective player wagering zone. The wager token sensors may be selected from several different types of sensors.

One suitable type of sensor is a weigh cell which senses the presence of a wager token thereon so that the master table controller knows at the start of a hand, that a player is participating in the next hand being played. A variety of weigh cells can be used. Another suitable type of sensor includes optical sensors. Such optical sensors can be photosensitive detectors which use changes in the sensed level of light striking the detectors. For example, in one implementation, the betting sensor may use ambient light which beams from area lighting of the casino or other room in which it is placed. When a typical wager token is placed in a player's wagering zone (e.g., 102), the amount of light striking the detector located beneath the zone is measurably diminished by the opaque wager token. The detector conveys a suitable electrical signal which indicates that a wager token has been placed within the wagering zone 102. A variety of other alternative detectors can also be used. A further type of preferred wager token sensor is one which can detect coding included on or in the wager tokens to ascertain the value of the wager token or chips being placed by the players into the player wagering zones. A preferred form of this type of sensor or detector is used to detect an integrated circuit based radio frequency identification unit which is included in or on the wager tokens. Such sensors are sometimes referred to as radio frequency identification detection or read-write stations.

It will be apparent to those skilled in the art that other memory types, including various computer readable media, may be used for storing and executing program instructions pertaining to one or more operations described herein. Because such information and program instructions may be employed to implement the systems/methods described herein, the present invention relates to machine-readable media that include program instructions, state information, etc. for performing various operations described herein.

Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files including higher level code that may be executed by the computer using an interpreter.

Additional details about other intelligent gaming table architectures, features and/or components are described, for example, in U.S. patent application Ser. No. 10/040,239, entitled, "GAME DEVELOPMENT ARCHITECTURE THAT DECOUPLES THE GAME LOGIC FROM THE GRAPHICS LOGIC," published on Apr. 24, 2003 as U.S. Patent Publication No. 20030078103, U.S. patent application Ser. No. 11/425,998, entitled "TABLE GAME BONUSING SYSTEMS AND METHODS," by Nguyen et al. Each of these applications is incorporated herein by reference in its entirety for all purposes.

In at least one embodiment, a respective handheld user input device (herein referred to as a UID) may be provided to each player (or selected players) at a gaming table for facilitating player input of various types of information such as, for example, game play instructions, wagering information, etc.

In at least one embodiment, associations may be made between UIDs and players (and/or player positions at the gaming table) such that each UID is associated with a different player (and/or player station) at the gaming table.

According to specific embodiments, each UID may include different types of features and/or functionalities such as, for example, one or more of the following (or combinations thereof):

functionality for operating as an input device for acquiring, receiving, and/or processing user input data such as, for example, player game play instructions, player wagering input data (e.g., increasing bets, checking bets, performing side wagering/backbetting activities, etc.);

functionality for generating additional information (e.g., timestamp information, device location information, etc.) associated with various types of user input received or detected at the UID;

functionality for detecting or acquiring user ID data;

functionality for detecting or acquiring credit information associated with a given player (e.g., the player currently associated with that UID);

functionality for reading an RFID tag or barcode on a player tracking card;

functionality for allowing the UID to be automatically activated/deactivated (e.g., UID may automatically deactivate if it is removed from the gaming table area);

functionality for converting mechanical motion into electrical energy (e.g., via piezo or electromagnetic action);

functionality for temporarily storing data and/or other information such as, for example, user input data, timestamp data, table touch location data, UID location data, wager denomination data, etc.;

functionality for transmitting user input information and/or other associated information to one or more local systems (e.g., local intelligent game table system) and/or remote systems (e.g., remote servers);

functionality for allowing a player to select cards for discard/holding;

functionality for allowing a player to perform wagering activities (e.g., increasing bets, checking bets, performing side wagering/backbetting activities, etc.);

functionality for retrieving and/or displaying player tracking data;

functionality for retrieving and/or displaying player account data;

functionality for displaying game play assistance information;

functionality for displaying casino layout information;

functionality for displaying promotional information;

etc.

In at least one embodiment, one or more UIDs may be configured or designed to have a size and shape similar to that of conventional-type touch pen devices such as, for example, the multi-function touch pen device embodiments illustrated and/or described in U.S. Pat. No. 6,806,868, herein incorporated by reference for all purposes. In other embodiments, one or more UIDs may be implemented in accordance with other desired sizes and/or shapes.

In at least one embodiment, each UID may be configured or designed to communicate using a different respective frequency. For example, in one embodiment, the gaming table system may be configured or designed to listen for a series of unique radio frequency signals, each corresponding to one of the UIDs registered for use at the gaming table. In one embodiment, when the UID makes contact with a location on the gaming table surface, the system can automatically identify the precise location and the ID of each UID.

In another embodiment each UID may include a unique RFID chip which, for example, may be powered briefly by a switch that is triggered, for example, when the UID makes contact with an object or surface (such as, for example, a location on the surface of the gaming table), and the RFID signal(s) may be used to identify which UID touched the table at which location. Additionally, in some embodiments, the gaming table system may also determine the time(s) at which each UID touched the table. In yet another embodiment, each UID may include a displayed optical bar code (or other machine readable code/pattern) which may be read by one or more devices/components of the gaming table system (e.g., in order to identify the UID associated with a detected table touch event).

In other embodiments, one or more cameras may be used to identify the player(s) (and/or related player activity) associated with each UID at the gaming table. For example, in one embodiment, each player might wear a visually identifiable tag, a electronic identification tag, or some other detectable means of identification.

In some embodiments, one or more UIDs may include functionality for implementing at least a portion of the features associated with other mobile devices such as those described, for example, in one or more of the following references, each of which being incorporated herein by reference in its entirety for all purposes: U.S. patent application Ser. No. 11/472,585 entitled "MOBILE DEVICE FOR PROVIDING FILTERED CASINO INFORMATION BASED ON REAL TIME DATA"; and U.S. patent application Ser. No. 10/062,002 for "GAMING SYSTEM AND GAMING METHOD."

In at least one embodiment, the gaming table system may include a plurality of UID docking regions. In one implementation, a separate UID docking region is provided at each player station at the intelligent gaming table. According to various embodiments, a UID docking region may include appropriate hardware and/or software for implementing a variety of functions or features such as, for example:

- performing UID detection, authentication, and/or identification;
- providing wired or wireless communication with selected UIDs;
- providing uni-directional or bi-directional communication with selected UIDs;
- providing power and/or battery charging capabilities to selected UIDs;
- reconfiguring UIDs;
- updating UID software;
- displaying UID status information;
- etc.

In at least one embodiment, the UID docking regions may be part of a casino gaming network which, for example, may include one or more of: intelligent gaming table systems, electronic gaming machines, game servers, player tracking servers, casino accounting servers, and/or other component(s) with which communication may be desired. The UID docking regions may also be adapted to provide at least one communication interface for allowing selected UIDs to communicate with desired components/systems of the casino gaming network.

In at least one embodiment, the UIDs and/or components of the gaming table system may include one or more communication interfaces for facilitating communication with each other. Such communication interfaces may have a variety of architectures and utilize a variety of protocols such as, for example, USB, IEEE-1394 (FireWire™), Ethernet, etc. (e.g., in cases where the communication link is a wired link), or one or more wireless links utilizing one or more wireless protocols such as, for example: 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetic communication protocols, etc. The communication links may transmit electrical, electromagnetic or optical signals which carry digital data streams or analog signals representing various types of information.

In at least some embodiments, the UIDs may be tethered wirelessly to the intelligent gaming table. In some other embodiments, the UIDs may be tethered by a wire or cable. Such wire or cable may provide an electrical/data connection to components of the intelligent gaming table. In one such embodiment, the UID docking regions may be omitted from the intelligent gaming table.

It will be appreciated that, in other embodiments, various combinations of UIDs and player displays may be used. For example, in some embodiments, all (or selected) player wagering instructions (and/or other wager-related activity, game play activities, etc.) may be implemented using UIDs. In at least some of these embodiments, one or more displays at an intelligent gaming table may be used to display selected information to different players such as, for example, wagering information (e.g., a textual and/or graphical representation of wagers placed by a given player), game rules, side wagering activities/information, other game play activities/information (e.g., keno, sports book wagering, etc.), etc.

In at least one implementation, a dealer at an intelligent gaming table may have access to or control over multiple UIDs which have not been yet been activated for play. When a new player desires to participate in the game being played at the intelligent gaming table, the dealer may select a UID for activation, activate the UID for use at the intelligent gaming table, and hand the activated UID over to the new player.

A variety of different security-related features may be implemented at the intelligent gaming table in order, for example, to address various issues such as player cheating, UID tampering, unauthorized wagering, unauthorized use of player tracking or account data, etc.

For example, in at least one implementation, a UID must first be activated and/or undergo a registration process before being allowed to be used at the intelligent gaming table. Different examples of UID activation procedures are described in greater detail, for example, with respect to FIG. 6-8 of the drawings.

In one embodiment, a player may possess his or her own UID which has been registered for that player's exclusive use. For example, the UID may be registered and linked to the player's player tracking account and/or the player's financial account(s). In at least one implementation, the player may carry his UID with him and use his UID for game play at any authorized intelligent gaming table. In one implementation, before a player-owned UID is enabled for use at the intelligent gaming table, a security check may be performed to authenticate and/or validate the UID before authorizing it for use at the intelligent gaming table, in order to help ensure that the UID has not been modified or tampered.

According to different embodiments, a UID may also be linked to a specific UID docking region which is associated with a specific player station at the intelligent gaming table. For example, in one implementation, before game play begins, a player at a given player station of the intelligent gaming table may be required to place his or her UID within that station's UID docking region. Once the game play begins, a pairing mechanism may be established between the player's UID and UID docking region. In one implementation, such pairing mechanism may result in the UID being unable to communicate with any other UID docking region at the intelligent gaming table during the game play (e.g., until the current round of game play has ended), and may also result in the UID docking region being unable to communicate with any other UID during the game play. Such pairing mechanisms may help prevent other players (and/or persons near the intelligent gaming table) from being able to gain access to unauthorized game play data (such as, for example, cards dealt to other players at the intelligent gaming table).

Another security measure which may be implemented relates to a UID function control mechanism which may be adapted to prevent a UID from performing certain functions and/or from displaying selected information based on the occurrence of various conditions. For example, in one implementation, the UID may be configured or designed to be operable only during times when the UID is within an authorized region or zone which, for example, may be defined based upon a predetermined distance (e.g., within 5 feet) from the intelligent gaming table and/or associated UID docking region. If the MD is moved to a location outside of the authorized region, the UID may be automatically deactivated (e.g., temporarily while the UID remains outside the authorized region).

According to a specific embodiment, one mechanism for implementing such a security feature is via the use of near-field magnetic communication technology. For example, in one implementation, at least one communication channel between a UID and its associated UID docking station may be implemented using a near-field communication protocol which has been adapted to allow a bi-directional communication between the MD and the UID docking station within a range of up to 5 feet. The UID may be adapted to require that this communication channel remain active in order to display the play the player's cards (and/or to display or perform other specified functions). When the UID is moved to a location more than 5 feet from the UID docking station, the near-field communication channel will go down, and in response, the UID may be adapted to take appropriate action such as, for example, to automatically disable specific functionality and/or features associated with the UID. When the UID is moved to a location within 5 feet from the UID docking station, the near-field communication channel may be re-established, and in response, the UID may take appropriate action to enable and/or reestablish specific functionality and/or features.

An example of a near-field communication protocol is the ECMA-340 "Near Field Communication—Interface and Protocol (NFCIP-1)," published by ECMA International, herein incorporated by reference in its entirety for all purposes. It will be appreciated that other types of Near Field Communication protocols may be used including, for example, near field magnetic communication protocols, near field RF communication protocols, and/or other wireless protocols which provide the ability to control with relative precision (e.g., on the order of centimeters, inches, feet, meters, etc.) the allowable radius of communication between at least 2 devices using such wireless communication protocols.

At first glance, one might think that adapting PC technologies to the gaming industry would be a simple proposition because both PCs and intelligent gaming tables employ microprocessors that control a variety of devices. However, because of such reasons as 1) the regulatory requirements that are placed upon intelligent gaming tables, 2) the harsh environment in which intelligent gaming tables operate, 3) security requirements and 4) fault tolerance requirements, adapting PC technologies to an intelligent gaming table can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in an intelligent gaming table because in an intelligent gaming table these faults can lead to a direct loss of funds from the intelligent gaming table, such as stolen cash or loss of revenue when the intelligent gaming table is not operating properly.

For the purposes of illustration, a few differences between PC systems and gaming systems will be described. A first difference between intelligent gaming tables and common PC based computers systems is that some intelligent gaming tables may be designed to be state-based systems. In a state-based system, the system stores and maintains its current state in a non-volatile memory, such that, in the event of a power failure or other malfunction the intelligent gaming table will return to its current state when the power is restored. For instance, if a player was shown an award for a table game and, before the award could be provided to the player the power failed, the intelligent gaming table, upon the restoration of power, would return to the state where the award is indicated. As anyone who has used a PC, knows, PCs are not state machines and a majority of data is usually lost when a malfunction occurs. This requirement affects the software and hardware design on an intelligent gaming table.

A second important difference between intelligent gaming tables and common PC based computer systems is that for regulation purposes, various software which the intelligent gaming table uses to generate table game play activities (such as, for example, the electronic shuffling and dealing of cards) may be designed to be static and monolithic to prevent cheating by the operator of intelligent gaming table. For instance, one solution that has been employed in the gaming industry to prevent cheating and satisfy regulatory requirements has been to manufacture an intelligent gaming table that can use a proprietary processor running instructions to generate the game play activities from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game play activities, such as adding a new device driver used by the master table controller to operate a device during generation of the game play activities can require a new EPROM to be burnt, approved by the gaming jurisdiction and reinstalled on the intelligent gaming table in the presence of a gaming regulator. Regardless of whether the EPROM solution is used, to gain approval in most gaming jurisdictions, an intelligent gaming table must demonstrate sufficient safeguards that prevent an operator or player of an intelligent gaming table from manipulating hardware and software in a manner that gives them an unfair and some cases an illegal advantage. The intelligent gaming table should have a means to determine if the code it will execute is valid. If the code is not valid, the intelligent gaming table must have a means to prevent the code from being executed. The code validation requirements in the gaming industry affect both hardware and software designs on intelligent gaming tables.

A third important difference between intelligent gaming tables and common PC based computer systems is the number and kinds of peripheral devices used on an intelligent gaming table are not as great as on PC based computer systems. Traditionally, in the gaming industry, intelligent gaming tables have been relatively simple in the sense that the number of peripheral devices and the number of functions the intelligent gaming table has been limited. Further, in operation, the functionality of intelligent gaming tables were relatively constant once the intelligent gaming table was deployed, i.e., new peripherals devices and new gaming software were infrequently added to the intelligent gaming table. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on an intelligent gaming table, intelligent gaming tables still have unique device requirements that differ from a PC, such as device security requirements not usually addressed by PCs. For instance, monetary devices, such as coin dispensers, bill validators and ticket printers and computing devices that are used to govern the input and output of cash to an intelligent gaming table have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in intelligent gaming tables that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

For example, a watchdog timer may be used in International Game Technology (IGT) intelligent gaming tables to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Intelligent gaming tables of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

One method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed has been stored. This feature allows the game to recover operation to the current state of play in the event of a malfunction, loss of power, etc that occurred just prior to the malfunction. In at least one embodiment, the gaming machine is configured or designed to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

In order to ensure the success of atomic transactions relating to critical information to be stored in the gaming machine memory before a failure event (e.g., malfunction, loss of power, etc.), it is preferable that memory be used which includes one or more of the following criteria: direct memory access capability; data read/write capability which meets or exceeds minimum read/write access characteristics (such as, for example, at least 5.08 Mbytes/sec (Read) and/or at least 38.0 Mbytes/sec (Write)). Devices which meet or exceed the above criteria may be referred to as "fault-tolerant" memory devices, whereas it is which the above criteria may be referred to as "fault non-tolerant" memory devices.

Typically, battery backed RAM devices may be configured or designed to function as fault-tolerant devices according to the above criteria, whereas flash RAM and/or disk drive memory are typically not configurable to function as fault-tolerant devices according to the above criteria. Accordingly, battery backed RAM devices are typically used to preserve gaming machine critical data, although other types of non-volatile memory devices may be employed. These memory devices are typically not used in typical general-purpose computers.

Thus, in at least one embodiment, the gaming machine is configured or designed to store critical information in fault-tolerant memory (e.g., battery backed RAM devices) using atomic transactions. Further, in at least one embodiment, the fault-tolerant memory is able to successfully complete all desired atomic transactions (e.g., relating to the storage of gaming machine critical information) within a time period of 200 milliseconds (ms) or less. In at least one embodiment, the time period of 200 ms represents a maximum amount of time for which sufficient power may be available to the various gaming machine components after a power outage event has occurred at the gaming machine.

As described previously, the gaming machine may not advance from a first state to a second state until critical information that allows the first state to be reconstructed has been atomically stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Thus, for example, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the intelligent gaming table and the state of the intelligent gaming table (e.g., credits) at the time the table game was played. The game history information may be utilized in the event of a dispute. For example, a player may decide that in a previous table game that they did not receive credit for an award that they believed they won. The game history information may be used to reconstruct the state of the intelligent gaming table prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758,828, titled, "Frame Capture of Actual Game Play," each of which is incorporated by reference and for all purposes.

Another feature of intelligent gaming tables, such as IGT gaming computers, is that they often include unique interfaces, including serial interfaces, to connect to specific subsystems internal and external to the intelligent gaming table. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the intelligent gaming table, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from an intelligent gaming table to a remote device. Often SAS is used in conjunction with a player tracking system.

IGT intelligent gaming tables may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT intelligent gaming table by monitoring security switches attached to access doors in the intelligent gaming table cabinet. Preferably, access violations result in suspension of game play and can trigger additional security operations to preserve the current state of game play. These circuits also function when power is off by use of a battery backup. In power-off operation, these circuits continue to monitor the access doors of the intelligent gaming table. When power is restored, the intelligent gaming table can determine whether any security violations occurred while power was off, e.g., via software for reading status registers. This can trigger event log entries and further data authentication operations by the intelligent gaming table software.

Trusted memory devices and/or trusted memory sources are preferably included in an IGT intelligent gaming table computer to ensure the authenticity of the software that may be stored on less secure memory subsystems, such as mass storage devices. Trusted memory devices and controlling circuitry are typically designed to not allow modification of the code and data stored in the memory device while the memory device is installed in the intelligent gaming table. The code and data stored in these devices may include authentication algorithms, random number generators, authentication keys, operating system kernels, etc. The purpose of these trusted memory devices is to provide gaming regulatory authorities a root trusted authority within the computing environment of the intelligent gaming table that can be tracked and verified as original. This may be accomplished via removal of the trusted memory device from the intelligent gaming table computer and verification of the secure memory device contents is a separate third party verification device. Once the trusted memory device is verified as authentic, and based on the approval of the verification algorithms included in the trusted device, the intelligent gaming table is allowed to verify the authenticity of additional code and data that may be located in the gaming computer assembly, such as code and data stored on hard disk drives. A few details related to trusted memory devices that may be used in the present invention are described in U.S. Pat. No. 6,685,567, filed Aug. 8, 2001 and titled "Process Verification," and U.S. patent application Ser. No. 11/221,314, filed Sep. 6, 2005, each of which is incorporated herein by reference in its entirety and for all purposes.

In at least one embodiment, at least a portion of the trusted memory devices/sources may correspond to memory which cannot easily be altered (e.g., "unalterable memory") such as, for example, EPROMS, PROMS, Bios, Extended Bios, and/or other memory sources which are able to be configured, verified, and/or authenticated (e.g., for authenticity) in a secure and controlled manner.

According to a specific implementation, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment of the present invention, the remote device and the trusted information source may engage in methods using zero knowledge proofs to authenticate each of their respective identities. Details of zero knowledge proofs that may be used with the present invention are described in US publication no. 2003/0203756, by Jackson, filed on Apr. 25, 2002 and entitled, "Authentication in a Secure Computerized Gaming System", which is incorporated herein in its entirety and for all purposes.

Gaming devices storing trusted information may utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Additional details relating to trusted memory devices/sources are described in U.S. patent application Ser. No. 11/078,966, entitled "SECURED VIRTUAL NETWORK IN A GAMING ENVIRONMENT", naming Nguyen et al. as inventors, filed on Mar. 10, 2005, herein incorporated in its entirety and for all purposes.

Mass storage devices used in a general purpose computer typically allow code and data to be read from and written to the mass storage device. In an intelligent gaming table environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. Details using a mass storage device that may be used with the present invention are described, for example, in U.S. Pat. No. 6,149,522, herein incorporated by reference in its entirety for all purposes.

FIG. 1B shows an example of a gaming table portion 150 in accordance with a specific embodiment. In one embodiment, gaming table portion 150 may represent a portion of a gaming table surface associated with a specific player station region at a gaming table, such as, for example, player station region 111c of FIG. 1A. For purposes of illustration, it is assumed in the example of FIG. 1B that gaming table portion 150 represents a portion of a player station region at a blackjack gaming table.

As illustrated in the example of FIG. 1B, gaming table portion 150 may include a variety of different types of content which may be displayed. According to different embodiments, all or selected portions of content displayed in the example embodiment of FIG. 1B may correspond to electronically displayed content which, for example, may be automatically and/or dynamically generated (e.g., by the gaming table system), and displayed to the user via one or more electronic displays. In some embodiments, at least a portion of content displayed in the example embodiment of FIG. 1B may correspond to static content which is displayed using non-electronic display technology (such as, for example, static content which is printed onto portions of felt covering the gaming table surface).

For purposes of illustration, it is assumed in the example embodiment of FIG. 1B that gaming table portion 150 is operable to display one or more of the following types of information (or combinations thereof):

Accounting-related content (e.g., 152) relating to cash, credits and/or other funds which are available for use by a player for placing wagers at the gaming table. In at least one embodiment, at least a portion of the Accounting Content may be automatically and/or dynamically generated, and may be displayed via an electronic display (e.g., 154).

Wager-related content (e.g., 160, 172, etc.) which is configured or designed to facilitate placement of wagers by one or more players at the gaming table. In at least one embodiment, at least a portion of the wager-related content may be automatically and/or dynamically generated, and may be displayed via an electronic display. For example, as shown in the example of FIG. 1B, gaming table portion 150 may include an electronic display (e.g., 162) which may be operable to display information relating to one or more wagers which are to be placed and/or which have been placed by a particular player at the gaming table.

Game play-related content (e.g., 165) which, for example, may be used by a player for providing instructions (e.g., player input instructions) relating to game play and/or other activities.

In at least one embodiment, portions of the displayed content of gaming table portion 150 may include one or more user input selection regions which have been configured or designed for use with one or more user input devices (UIDs). For example, in at least one embodiment, a player's user input device (UID) may be operable to read various types of information from one or more user input selection regions at the gaming table.

For example, in one embodiment, it may be assumed in the example of FIG. 1B that at least a portion of the content displayed in regions 160 and 165 includes various types of input selection content which, for example, may be read by a player's UID and used to facilitate selection and/or input relating to the player's game play instructions, wagering instructions, etc.

For example, as illustrated in the example of FIG. 1B, region 160 may include an input selection region 166 which includes displayed wager-input selection information (e.g., static wager denomination values of $1, $5, $10) which has been configured or designed to be displayed via a machine readable format in order, for example, to allow the displayed content to be read, interpreted and/or otherwise detected by one or more user input devices. In at least one embodiment, the displayed wager-input selection information may include a first a portion of human-readable content comprising, for example, alpha-numeric characters and/or symbols (e.g., "$1"), which maybe observed and recognized by a human such as, for example, a player at the gaming table. Additionally, in at least one embodiment, the displayed wager-input selection information may include a second portion of machine-readable content (not shown) which, for example, maybe detected and/or read by a player's UID.

Additionally, as illustrated in the example of FIG. 1B, region 165 may include displayed game play input selection information (e.g., relating to various possible game play instructions associated with blackjack game play) which has been configured or designed to be displayed via a machine readable format in order, for example, to allow the displayed content to be read, interpreted and/or otherwise detected by one or more user input devices.

According to different embodiments, the first portion of machine readable data may be printed or displayed on selected portions of the surface of the gaming table, may be embedded in material covering portions of the gaming table surface, and/or may be displayed via one or more electronic displays at the gaming table. Additionally, according to some embodiments, at least a portion of the machine readable data may be displayed in a manner which is invisible or non-visible to a human observer. For example, in one embodiment, the first portion of machine readable data may include symbols, characters, colors and/or patterns which have been printed on the first region of the gaming table surface using infrared reflective ink (such as, for example, AB820 Black ink which is available from Kawamura Chemical Co.), UV or black light reflective inks, and/or other types of "invisible" inks. In at least some embodiments, the machine readable data may include one or more patterns or colors.

In at least one embodiment, one or more of the electronic display (e.g., 154, 162) may be associated with a respective player station and/or player at the gaming table. In at least one embodiment, one or more of the displays may be operable to display various types of information such as, for example, one or more of the following (or combinations thereof): game play information, wagering information, player tracking information, bonus game information, etc.

Figure 4C:
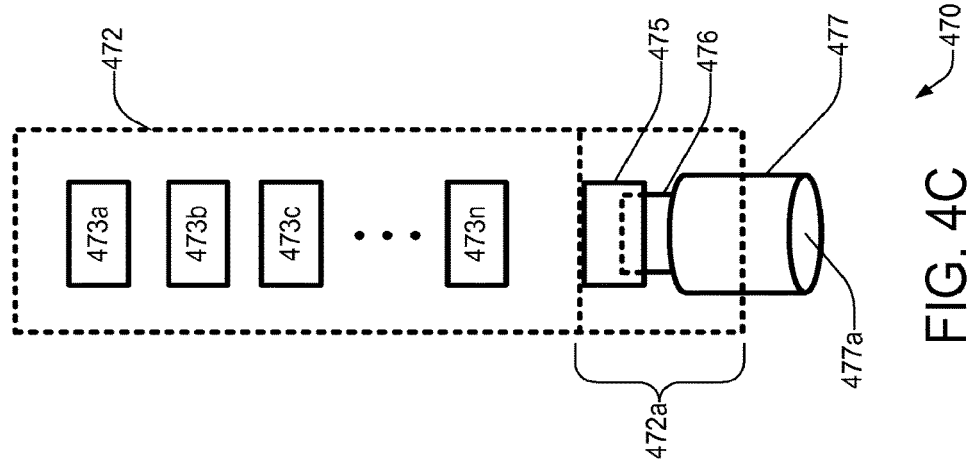
FIGS. 4A-C show different example embodiments of user input devices (UIDs).
Figure 4A:
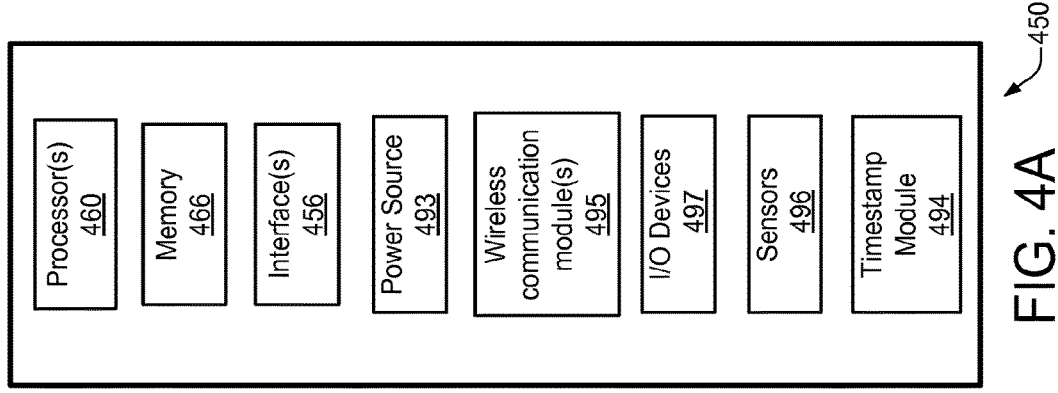

FIG. 4A shows a simplified block diagram of various components which may be used for implementing a user input device (UID) in accordance with a specific embodiment. As illustrated in the example of FIG. 4A, UID 450 may include a variety of components, modules and/or systems for providing functionality relating to one or more aspects described herein. Other UID embodiments (not shown) may include different or other components than those illustrated in FIG. 4A.

In at least one embodiment, UID 450 may include, but may not be limited to, one or more of the following (or combination thereof):

- At least one processor or CPU (460). In at least one implementation, the processor(s) 460 may be operable to implement features and/or functionality similar to other processors referenced or described herein.
- Memory 466, which, for example, may include volatile memory (e.g., RAM), non-volatile memory (e.g., disk memory, FLASH memory, EPROMs, etc.), unalterable memory, and/or other types of memory. In at least one implementation, the memory 466 may be operable to implement features and/or functionality similar to other memory referenced or described herein.
- Interface(s) 456 which, for example, may include wired interfaces and/or wireless interfaces. In at least one implementation, the interface(s) 456 may be operable to implement features and/or functionality similar to other interfaces referenced or described herein. In at least one embodiment, interfaces 465 may include one or more wireless communication interfaces for enabling wireless communication with one or more components at a gaming table system.
- Wireless communication module(s) 495. In one implementation, the wireless communication module 495 may be configured or designed to communicate with components of electronic game tables, electronic gaming machines, remote servers, electronic gaming machines, other wireless devices (e.g., PDAs, other UIDs, cell phones, player tracking transponders, etc.), base stations, etc. Such wireless communication may be implemented using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.
- At least one power source 493. In at least one implementation, the power source may include at least one mobile power source for allowing the UID to operate in a mobile environment. For example, in one implementation, power source 493 may include at least one battery, which for example, may be implemented as a rechargeable type battery. Further, in embodiments where it is desirable for the UID to be flexible, the battery 493 may be designed to be flexible.
- One or more user I/O Device(s) 497 such as, for example, motion detection/gesture interpretation input interfaces, touch keys/buttons 497, scroll wheels, cursors, touchscreen sensors, optical scanner devices (e.g., for reading machine readable characters and/or symbols), magnetic scanner devices (e.g., for reading magnetic information from credit cards, player tracking cards, ID cards, etc.), etc.
- One or more sensor(s) 496 such as, for example, motion detection sensors, contact sensors (e.g., for detecting contact with other objects), acoustic sensors, light sensors, orientation sensors, thermal sensors, pressure sensors, etc.
- Timestamp Module 494. In one embodiment, the timestamp module may be configured or designed to generate timestamp information relating to one or more events (e.g., such as a data input and/or data read event) which may be detected by the UID and/or which may occur at the UID. In at least one embodiment, the timestamp module may include a clock, counter and/or timestamp generator. Additionally, in at least one embodiment, the timestamp module may include timestamp synchronization componentry for periodically and/or automatically synchronizing its local clock or timestamp generator with an external clock source such as, for example, a GPS clock source, a clock source associated with the gaming table system, etc.

According to various embodiments, game tables, gaming machines, and/or other devices which are operable to receive communications from one or more UIDs may include at least one receiver for receiving information transmitted by one or more UIDs. In one embodiment, the receiver may be implemented as a multi-channel multi-frequency receiver adapted to concurrently receive signals from a plurality of different UIDs.

In at least one embodiment, the UID 450 may be operable to automatically and dynamically select an appropriate mode of operation based on various parameters and/or upon detection of specific events or conditions such as, for example: the UID's current location; identity of current user; user input; system override (e.g., emergency condition detected); proximity to other UIDs belonging to same group or association; proximity to specific objects, regions, zones, etc. Additionally, the UID may be operable to automatically update or change its current operating mode to the selected mode of operation. The UID may also be adapted to automatically modify accessibility of user-accessible features and/or information in response to the updating of its current mode of operation.

According to specific embodiments, associations may be made between UIDs and players (and/or player positions at a game table) such that each active UID is associated with a unique player or user during a given time period.

According to specific embodiments, the UID may also be adapted to perform other functions such as, for example, one or more of the following (or combination thereof):

- allowing a player conduct game play activities;
- allowing a player to input game play instructions;
- allowing a player to perform wagering activities (e.g., increasing bets, checking bets, performing side wagering/backbetting activities, etc.);
- retrieving and/or displaying player tracking data;
- retrieving and/or displaying player account data;
- displaying game play assistance information;

displaying casino layout information;
displaying promotional information;
notify a player of messages;
displaying multimedia information from external sources;
displaying player's current location;
etc.

For example, in one implementation, a UID may be adapted to communicate with a remote server to access player account data, for example, to know how much funds are available to the player for betting/wagering.

In at least one implementation, the UID may also include other functionality such as that provided by PDAs, cell phones, and/or other mobile computing devices. Further, in at least one implementation, the UID may be adapted to automatically and/or dynamically change its functionality depending on various conditions such as, for example: type of game being played; user input; current location or position; detection of local electronic gaming tables/devices; etc.

In at least one embodiment, a UID may be implemented using conventional mobile electronic devices (e.g., PDAs, cell phones, etc.) which have been specifically adapted to implement at least a portion of the UID functionalities described herein.

Figure 4B:
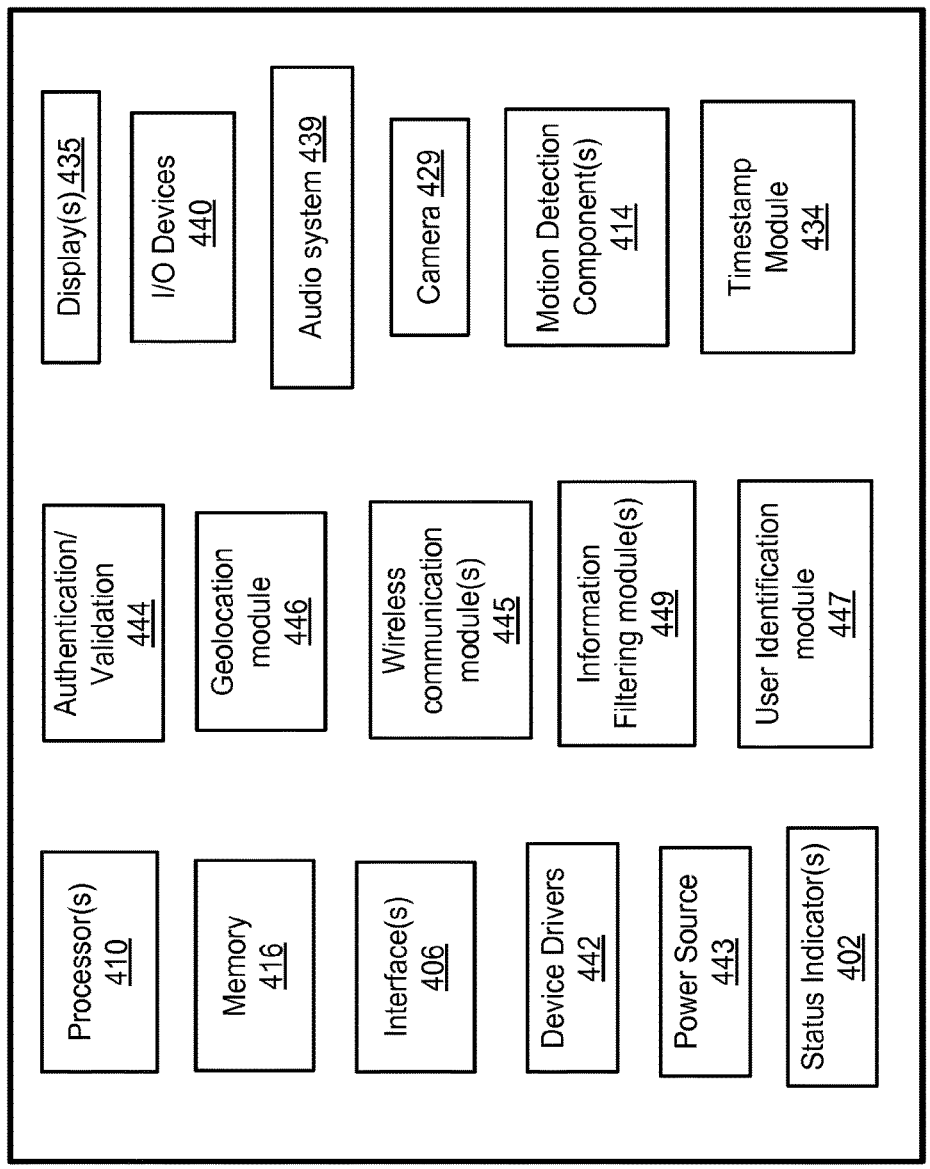

FIG. 4B is a simplified block diagram of an alternate example user input device (UID) 400 in accordance with a specific embodiment. As illustrated in the example of FIG. 4B, UID 400 may include a variety of components, modules and/or systems for providing functionality relating to one or more aspects described herein. Other UID embodiments (not shown) may include different or other components than those illustrated in FIG. 4B.

In at least one embodiment, UID 400 may include, but is not limited to, one or more of the following (or combinations thereof):

- At least one processor 410. In at least one implementation, the processor(s) 410 may be operable to implement features and/or functionality similar to other processors referenced or described herein.
- Memory 416, which, for example, may include volatile memory (e.g., RAM), non-volatile memory (e.g., disk memory, FLASH memory, EPROMs, etc.), unalterable memory, and/or other types of memory. In at least one implementation, the memory 416 may be operable to implement features and/or functionality similar to other memory referenced or described herein.
- Interface(s) 406 which, for example, may include wired interfaces and/or wireless interfaces. In at least one implementation, the interface(s) 406 may be operable to implement features and/or functionality similar to other interfaces referenced or described herein.
- Device driver(s) 442. In at least one implementation, the device driver(s) 442 may be operable to implement features and/or functionality similar to other device driver(s) described herein.
- At least one power source 443. In at least one implementation, the power source may include at least one mobile power source for allowing the UID to operate in a mobile environment.
- Authentication/validation components 444 which, for example, may be used for authenticating and/or validating local hardware and/or software components and/or hardware/software components residing at the UID. In at least one implementation, the authentication/validation component(s) 444 may be operable to implement features and/or functionality similar to other authentication/validation components described herein.
- Geolocation module 446 which, for example, may be configured or designed to acquire geolocation information from remote sources and use the acquired geolocation information to determine information relating to a relative and/or absolute position of the UID. For example, in one implementation, the geolocation module 446 may be adapted to receive GPS signal information for use in determining the position or location of the UID. In another implementation, the geolocation module 446 may be adapted to receive multiple wireless signals from multiple remote devices (e.g., gaming machines, servers, wireless access points, RFID transponders, etc.) and use the signal information to compute or determine position/location information relating to the real-time position or location of the UID.
- Wireless communication module(s) 445. In one implementation, the wireless communication module 445 may be configured or designed to communicate with external devices using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.
- User Identification module 447. In one implementation, the User Identification module may be adapted to determine the identity of the current user or owner of the UID. For example, in one embodiment, the current user may be required to perform a log in process at the UID in order to access one or more features. Alternatively, the UID may be adapted to automatically determine the identity of the current user based upon one or more external signals such as, for example, an RFID tag or badge worn by the current user which provides a wireless signal to the UID for determining the identity of the current user. In at least one implementation, various security features may be incorporated into the UID to prevent unauthorized users from accessing confidential or sensitive information.
- At least one motion detection component 414 for detecting motion or movement of the UID and/or for detecting motion, movement, gestures and/or other input data from the user.
- One or more display(s) 435. According to various embodiments, such display(s) may be implemented using, for example, LCD display technology, OLED display technology, and/or other types of conventional display technology. In at least one implementation, one or more display(s) may be adapted to be flexible or bendable. Additionally, in at least one embodiment one or more of the display(s) may utilize e-ink technology (such as that available from E Ink Corporation, Cambridge, Mass.), or other suitable technology for reducing the power consumption of information displayed on the display(s). In some embodiments, it may be desirable to not include a display at the UID.
- One or more status indicators 402. For example, in one implementation, one or more colored status indicators (such as, for example, LEDs) may be included on one or more sides of a UID, and adapted to provide various information such as, for example: communication status; game play status; wager status, UID health status; UID operating mode; battery power status; battery charging status; input or gesture detection status; error detection status; out of range status; etc.
- Information filtering module(s) 449, which, for example, may be configured or designed to filter information processed by the UID to thereby generate filtered information intended for display and/or transmission to other components, devices, systems.

One or more user I/O Device(s) 440 such as, for example, keys, buttons, scroll wheels, cursors, touchscreen interfaces, motion detection/gesture interpretation interfaces, audio command interfaces, magnetic strip readers (which, for example, may be configured or designed to read information from magnetic strips such as those on credit cards, player tracking cards), optical scanners (which, for example, may be configured or designed to read information such as text, barcodes, machine readable code, characters, patterns, etc.), etc.

Audio system 439 which, for example, may include speakers, microphones, wireless transmitter/receiver devices for enabling wireless audio and/or visual communication between the UID 400 and remote devices (e.g., radios, telephones, computer systems, etc.). For example, in one implementation, the audio system may include componentry for enabling the UID to function as a cell phone or two-way radio device.

Camera 429 which, for example, may be configured or designed to record still images (e.g., digital snapshots) and/or video images.

Other types of peripheral devices 431 which may be useful to the users of such UIDs, such as, for example: PDA functionality; memory card reader(s); fingerprint or other biometric reader(s); image projection device(s); ticket reader(s); etc.

Timestamp Module 434. In one embodiment, the timestamp module may be configured or designed to generate timestamp information relating to one or more events (e.g., such as a data input and/or data read event) which may be detected by the UID and/or which may occur at the UID. In at least one embodiment, the timestamp module may include a clock, counter and/or timestamp generator. Additionally, in at least one embodiment, the timestamp module may include timestamp synchronization componentry for periodically and/or automatically synchronizing its local clock or timestamp generator with an external clock source such as, for example, a GPS clock source, a clock source associated with the gaming table system, etc.

In one embodiment, the motion detection component 414 may be operable to detect gross motion of a user (e.g., player, dealer, etc.). Additionally, in at least one embodiment, the motion detection component 414 may further be operable to perform one or more additional functions such as, for example: analyze the detected gross motion or gestures of a participant; interpret the participant's motion or gestures (e.g., in the context of a casino game being played) in order to identify instructions or input from the participant; utilize the interpreted instructions/input to advance the game state; etc. In other embodiments, at least a portion of these additional functions may be implemented at a remote system or device.

For example, during play of a game of blackjack at a conventional game table, a player may signal "hit me" to the dealer by the player flicking or moving his cards in a sweeping motion towards the player. In at least one embodiment where the player is performing the "hit me" gesture using a UID (e.g., instead of or in addition to using conventional playing cards), the UID may be adapted to automatically detect the player's gesture (e.g., gross motion) by sensing motion or movement (e.g., rotation, displacement, velocity, acceleration, etc.) using, for example, one or more motion detection sensors. In one embodiment, the UID may also be adapted to analyze the detected motion data in order to interpret the gesture (or other input data) intended by the player. Once interpreted, the UID may then transmit the interpreted player input data (e.g., "hit me") to the game table for advancement of the game state. Alternatively, the UID may be adapted to transmit information relating to the detected motion data to the game table, and the game table adapted to analyze the detected motion data in order to interpret the gesture (or other input data) intended by the player.

According to different embodiments, other criteria may also be used when analyzing the detected motion data for proper interpretation of the player's gestures and/or other input instructions. For example, the interpretation of the detected motion data may be constrained based on one or more of the following criteria (or combination thereof): type of game being played (e.g., craps, blackjack, poker, slots, etc.), location of the player/UID; current UID operating mode (e.g., table game operating mode, gaming machine operating mode, bonus game operating mode, restaurant operating mode, theater operating mode, lounge operating mode, hotel operating mode, parking service operating mode, room service operating mode, news magazine operating mode, etc.); game rules; time; player ID; player preferences; previous motion interpretation/analysis; and/or other criteria described herein.

In at least one embodiment, the motion detection component 414 may include one or more motion detection sensors such as, for example, MEMS (Micro Electro Mechanical System) accelerometers, that can detect the acceleration and/or other movements of the UID as it is moved by a user. Examples of suitable MEMS accelerometers may include, but are not limited to, one or more of the following (or combination thereof): Si-Flex™ SF1500L Low-Noise Analog 3g Accelerometer (available from Colibrys, Inc., Stafford, Tex.); MXC6202 Dual Axis Accelerometer (available from MEMSIC, Inc. 800, North Andover, Mass.); ADXL330 iMEMS Accelerometer (available from Analog Devices, Norwood, Mass.); etc.

In at least some embodiments, other types of motion detection components may be used such as, for example, inertial sensors, MEMS gyros, and/or other motion detection components described herein. For example, MEMS accelerometers may be particularly suited for applications involving relatively large degrees of vibration, impact, and/or fast motion. MEMS gyros are great for may be particularly suited for applications involving orientation sensing and/or slow movements.

In at least one embodiment, motion detection component 414 may include at least one "Spring Board Accelerometer". One embodiment of the Spring Board Accelerometer may be implemented in a manner similar to that of a diving board, in that it may be attached at one end and may be allowed to bend (under the influence of gravity). If desired, a specified amount of mass may be added to the free end.

In at least one embodiment, the free end of the "spring board" may be implemented as movable plate of a capacitor with the other plate of the capacitor being fixed (e.g., to a frame or body). Such a Spring Board Accelerometer embodiment may be used to measure the influence of gravity. For example, according to one embodiment, as gravity bends the board, the distance between the plates of the capacitor decreases (e.g., the plates get closer to each other), and the capacitance increases [e.g., Capacitance= (k*Area of plates)/distance between plates]. For example, if the accelerometer is stationary (e.g., lying on a table with the spring board parallel with the table top) then the output of that board may be +1 g and a first output signal (e.g., DC voltage signal) may be output from the device (e.g., using electronics operable to measure the capacitance of the plates, and/or to generate the DC output signal(s)). If the spring board is subsequently turned over, the output of that board will be at −1 g, and the DC voltage output signal will also change polarity. As the board is rotated about an axis parallel to the board, the output may dynamically change from +1 g to −1 g, with 0 g being the point where the board is perpendicular to the force of gravity. In one embodiment, a graph of this function may be expressed as a cosine function from 0 to pi.

According to specific embodiments, spring board accelerometers may be suitable for use as sensors of vibration. For example, in one embodiment the spring board accelerometer(s) may be optimized to detect vibration frequencies of less than 400 Hz for use in gesture interpretation analysis. In one embodiment, it may be preferable that the frequency of detected vibration(s) (e.g., for use in gesture interpretation analysis) is below the resonance frequency of the spring board. For example, in at least one embodiment, the length of the spring board and the mass of the spring board may be configured or designed such that the frequency of resonance of the board is greater than 400 Hz.

Spring board accelerometers may also be suitable for use as sensors of impacts since, for example, such devices may be configured or designed to detect and withstand relatively fast accelerations (e.g., resulting from free fall conditions) in one or more planes. For example, fast acceleration in one plane may result in the board bending until its limits are encountered. Such devices may be suitable for use as sensors for measuring tilt of an object. For example, in one embodiment, a spring board accelerometer may be configured or designed to provide an output DC voltage that is proportional to the angle of tilt, acceleration, rotation of an object such as, for example, a portable gaming device or a player's hand or arm.

In at least one embodiment, the UID may be further adapted to transmit motion information (and other related information) to a gaming machine, game table and/or other devices. In one implementation, the motion information may include data such as, for example: a UID ID for use in identifying the MD which transmitted information; user ID information for use in identifying the user holding the UID, movement data relating to the X, Y, and/or Z axes, etc. According to one implementation, analog acceleration data output from the accelerometers may be digitized and fed into a multiplexer and transmitted to a remote device or system such as, for example, a gaming machine, a game table, a remote server, etc.

According to a specific embodiment, the UID 400 may be adapted to implement at least a portion of the features associated with the mobile game service system described in U.S. patent application Ser. No. 10/115,164, which is now U.S. Pat. No. 6,800,029, issued Oct. 4, 2004, which is hereby incorporated by reference in its entirety for all purposes. For example, in one embodiment, the UID 400 may be comprised of a hand-held game service user interface device (GSUID) and a number of input and output devices. The GSUID may include a display screen which may display a number of game service interfaces. These game service interfaces may be generated on the display screen by a microprocessor of some type within the GSUID. Examples of a hand-held GSUID which may accommodate the game service interfaces are manufactured by Symbol Technologies, Incorporated of Holtsville, N.Y.

In addition to the features described above, the UID of the present invention may also include additional functionality for displaying, in real-time, filtered information to the user based upon a variety of criteria such as, for example, geolocation information, casino data information, player tracking information, game play information, wager information, motion detection information, gesture interpretation information, etc.

As used herein, the term "UID" may be used to describe and variety of different types of electronic devices which may include, but are not limited to, one or more of the following (or combination thereof): mobile devices, wireless devices, portable devices, handheld devices, etc.

FIG. 4C shows a simplified block diagram of a specific embodiment of a user input device (UID) 470. In the example of FIG. 4C it is assumed that UID 470 includes at least a portion of the components illustrated, for example, in the example of UID embodiment of FIG. 4A such as, for example, at least one processor, memory, at least one wireless interface, a portable power source, and an optical scanner. However, for purposes of simplification and in order to avoid confusion, many of these components are not specifically shown in the illustrated UID embodiment of FIG. 4C. Additionally, it will be appreciated that other UID embodiments (not shown) may include different or other components than those illustrated or described with respect to FIG. 4C.

As illustrated in the example of FIG. 4C, UID 470 may include an external housing 472 (shown in phantom) which may be configured or designed to have an associated size and shape which permits the UID to be held in a hand of a user and/or which permits the user to handle the UID in a manner similar to that of a conventional-type touch pen device.

As illustrated in the example of FIG. 4C, UID 470 may also include an electronic and/or mechanical plunger-type mechanism 475, 476, 477) which may be manipulated, deployed and/or actuated (e.g., via the user's actions) to cause the UID to read and/or record selected input data.

For example, in one embodiment, UID 470 may include an optical reader device which is configured or designed to read machine-readable data (e.g., bar codes, symbols, characters, patterns, colors, etc.) via distal end portion 477a of the UID. Thus, for example, according to one embodiment, a user (e.g., player) may place distal end portion 477a in contact with a first region of the gaming table surface which includes a first portion machine readable data. According to different embodiments, the first portion of machine readable data may be printed or displayed on the surface of the gaming table, may be embedded in the material of the gaming table surface, and/or may be displayed via one or more electronic displays at the gaming table. Additionally, according to some embodiments, at least a portion of the machine readable data may be displayed in a manner which is invisible or non-visible to a human observer. For example, in one embodiment, the first portion of machine readable data may include symbols and/or characters which have been printed on the first region of the gaming table surface using infrared reflective ink (such as, for example, AB820 Black ink which is available from Kawamura Chemical Co.), UV or black light reflective inks, and/or other types of "invisible" inks. In at least some embodiments, the machine readable data may include one or more patterns or colors.

Assuming that the UID has been positioned by the user to cause distal end portion 477a to contact the first region of the gaming table surface, the user may then perform one or more actions (such as, for example, pushing or pressing down on the UID to deploy or move the plunger mechanism) to cause the UID to initiate a read of the first portion of machine readable data. According to different embodiments, the various actions which may be performed by the user to cause the UID to initiate a read of machine readable data may include, but are not limited to, one or more of the following (or combinations thereof): pushing or pressing down on the UID (e.g., against the gaming table surface) with a sufficient amount of force that exceeds a minimum threshold amount of force required for triggering the UID to initiate a read of machine readable data; depressing one or more keys or buttons on the UID; etc.

In at least one embodiment where the UID includes an optical reader device, the UID may utilize the optical reader device to perform one or more reads of machine readable data. In one embodiment, the UID may be configured or designed to perform optical reads of machine readable data via distal end portion 477a. According to different embodiments, the machine readable data may include, but is not limited to, information relating to one or more of the following (or combinations thereof):
  game play information/instructions;
  wager information/instructions;
  user-related information;
  accounting or financial information;
  player station identity information;
  voucher and/or coupon related information;
  game state information;
  bonus information;
  other types of information which may be processed and/or utilized by the UID in performing one or more operations.

For example, in at least one embodiment, a UID may be operable to read a bar code (or other types of machine readable code) on a player's player tracking card to obtain information relating to the identity of the user. In at least one embodiment, the UID may also be operable to read an electronically displayed bar code (or other types of machine readable code), such as, for example, a bar code which is displayed at a display associated with a specific player station at the gaming table. In one embodiment, the electronically displayed bar code information may include information relating to an identifier which, for example, may be uniquely associated with that particular display and/or specific player station. Thereafter, an association may be made between the identified player and the player's position (e.g., at a particular player station) at the gaming table.

In some embodiments, the UID may also be operable to read machine readable information which is displayed on other electronic displays such as, for example, cell phones, PDAs, other gaming table displays, gaming machine displays, etc.

In at least one embodiment, the UID may also be operable to read machine readable information which is displayed on other objects such as, for example, a paper voucher, coupon, ticket, wagering tokens, credit cards, etc. For example, in one embodiment, wagering credits (and/or other indicia which may be used for wagering) may be issued to a player by way of a printed voucher or ticket which includes machine-readable data representing to an amount or value of wagering credits associated with that specific voucher or ticket. In one embodiment, a player may use his or her UID to read the machine-readable data on the voucher or ticket. Further, in at least one embodiment, the credit information read from the player's voucher or ticket may be used to allocate an amount of wagering credits for use by that player in placing wagers at the gaming table.

In at least one embodiment, each UID may have associated therewith a unique identifier. In at least one embodiment, the unique identifier associated with a particular UID may be used to create one or more associations between that UID and a given player, player station, etc.

In other embodiments (not shown) the UID may include other mechanisms for reading information from various surfaces, objects and/or displays. For example, in at least one embodiment, a UID may include an RFID detector which is capable of reading information from various different sources such as, for example, one or more of the following (or combinations thereof): a player's ID card, a player tracking card, a credit card, a gaming or wagering token, specific locations of the gaming table surface (e.g., wherein each specific location has a unique RF identifier associated therewith), etc.

In at least one embodiment, various information which is read, detected, received, and/or generated by a UID may be automatically recorded or stored (e.g., at least temporarily) in local memory at the UID. For example, in at least one embodiment, the UID memory may be configured or designed to include at least one buffer, queue, array, and/or other type(s) of data structure(s) which are operable to store (and/or provide access to) various different chunks of information (e.g., 473a-473n) which may be stored or recorded at the UID.

Figure 5A:
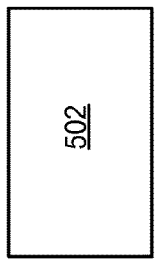
FIGS. 5A-C illustrate different example embodiments of various types of data chunks and associated formats which may be used for storing and/or accessing various types of information.
Figure 5B:
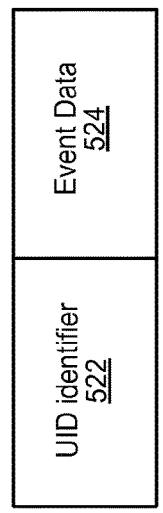
Figure 5C:
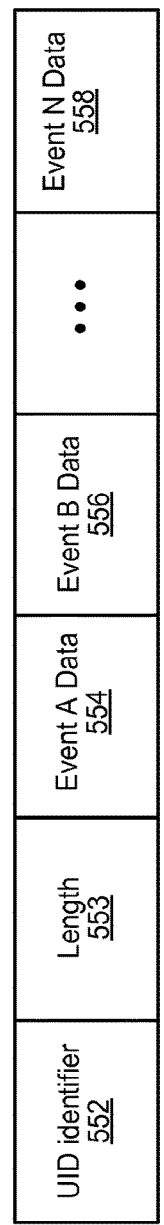

FIGS. 5A-C illustrate different example embodiments of various types of data chunks (e.g., 502, 520, 550) and associated formats which may be used for storing and/or accessing various types of information at the UID memory.

According to different embodiments, one or more different types of data structures may be used for storing information within the UID memory. Examples of different data structure types may include, but are not limited to, one or more of the following (or combinations thereof):
  queue;
  stack;
  linked list;
  heap;
  dictionary;
  tree;
  external memory data structure;
  passive data structure;
  active data structure;
  persistent data structure;
  recursive data structure;
  etc.

In at least one embodiment, one or more of the data structures of the UID memory may be formed using a variety of different types of data structure building blocks such as, for example, arrays, records, discriminated unions, references, etc.

FIG. 5A shows a first example of a data structure portion 502 in accordance with a specific embodiment. In at least one embodiment, data structure portion 502 may correspond to a given item or record of a given data structure of the UID memory. In at least one embodiment, each item or record of a data structure may include one or more fields for storing different types of information. Examples of different types of information which may be stored at (and/or used to populate) a given item or record of a data structure may include, but are not limited to, one or more of the following (or combinations thereof):
  UID identifier information (e.g., which may be used for uniquely identifying that particular UID);
  timestamp information;
  data record length information;

user ID information (e.g., which may be used for uniquely identifying the current user of the UID;

various types of event information (e.g., relating to one or more events detected at the UID) such as, for example, one or more of the following (or combinations thereof): sensor information; I/O device information; user input information; information read by or received at the UID; UM location information; etc.;

etc.

In at least one embodiment, each time the UID detects the occurrence of a data input event at the UID (which, for example, may be triggered by the UID performing a successful read of machine readable data from an external source), the UID may automatically create and/or modify at least one data record to include selected information relating to the data input event.

For example, in one embodiment, when the UID detects the occurrence of a data input event at the UID, which, for example, corresponds to the UID successfully performing a read of machine readable data from an external source, the UID may automatically create and store a corresponding data record (e.g., 520, FIG. 5B) which, for example, may be populated with data relating to one or more of the following (or combinations thereof): UID identifier information (e.g., 522), event data information (e.g., 524), etc. In at least one embodiment, the event data information may include, for example, one or more of the following (or combinations thereof): information corresponding to (or relating to) the machine readable data which was read by the UID; timestamp information relating to the detected data input event; location information relating to the location of the UID at the time of the data read; etc.

In at least some embodiments, when the UID detects the occurrence of a data input event at the UID (which, for example, corresponds to the UID successfully performing a read of machine readable data from an external source), the UID may automatically modify at least one selected data record (e.g., stored in the UID memory) by populating the selected data record with additional data relating to the data read event.

FIG. 5B illustrates an example embodiment of a data record 520 which includes information relating to a single data input event which has been processed by a UID.

FIG. 5C illustrates an example embodiment of a data record 550 which includes information relating to multiple different data input events which have been processed by a UID. As illustrated in the example of FIG. 5C, data record 550 may include, a plurality of different event data portions 554, 556, 558), wherein each event data portion includes information relating to a different respective data input event which has been processed by the UID. Additionally, as illustrated in the example of FIG. 5C, data record 550 may also include a length field 553 which, for example, may include information relating to the length (e.g., bit length, byte length, etc.) of the data record 550.

Figure 3A:
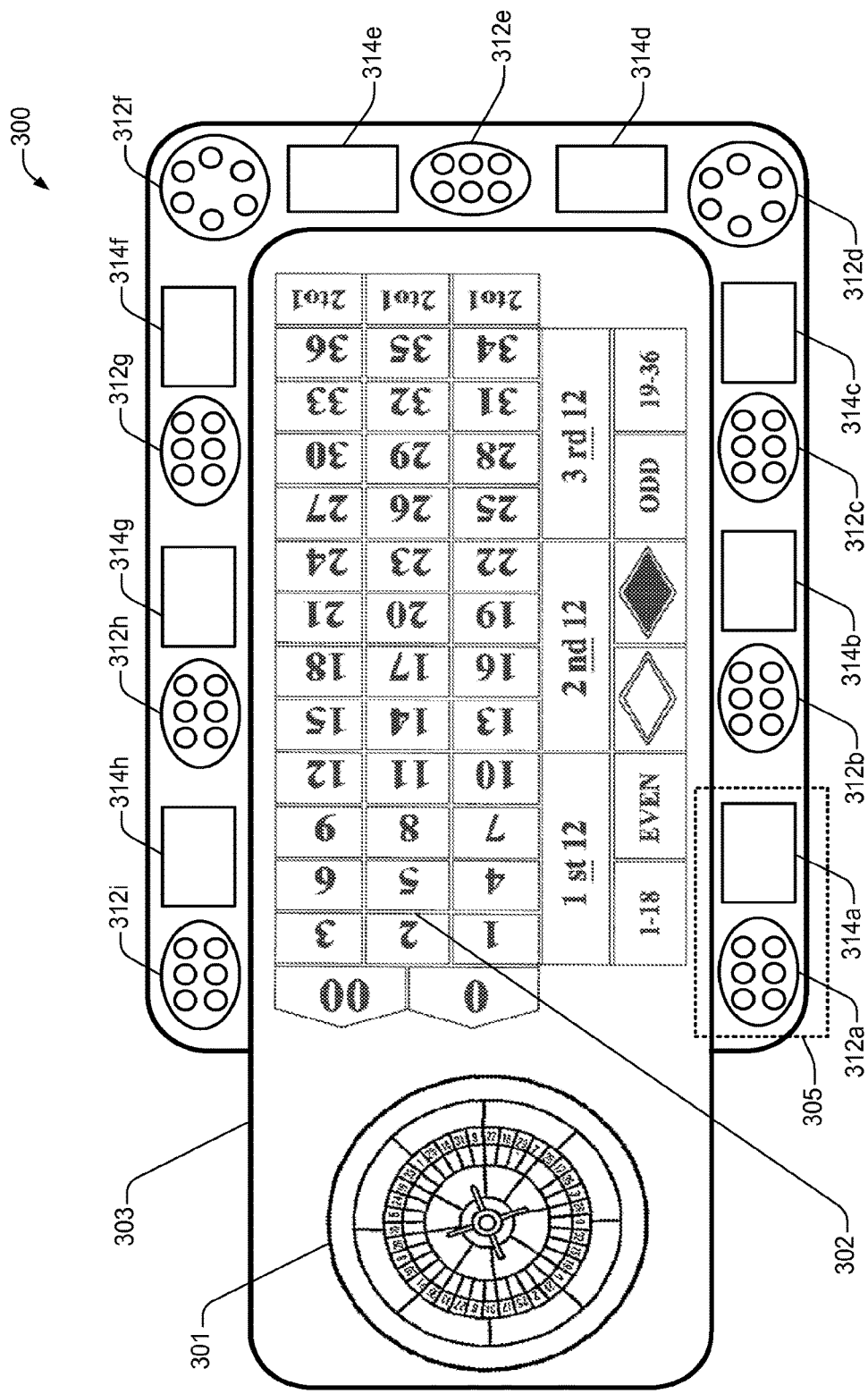
FIGS. 3A-D show specific examples of gaming table system embodiments and portions thereof.

FIG. 3A shows a specific example of a gaming table system 300 in accordance with a specific embodiment. In the example embodiment of FIG. 3A, it is assumed that gaming table system 300 has been configured or designed for use as a roulette gaming table. In at least one embodiment, gaming table system 300 has been adapted for use with one or more user input devices such as, for example, one or more embodiments of user input devices (UIDs) described herein.

As illustrated in the example of FIG. 3A, gaming table system 300 may include one or more of the following components and/or features (and/or combinations thereof):

At least one game play activity region (e.g., 301) where, for example, game play activities may occur, game play data may be generated, and/or game outcome data may be displayed.

At least one shared or common player wagering region (e.g., 302) which, for example, may be concurrently accessed or used by one or more players at the gaming table for placing wagers and/or for performing various wager-related activities.

A plurality of electronic displays (e.g., 314*a-h*). In at least one embodiment, one or more displays may each be associated with a respective player station and/or player at the gaming table. In at least one embodiment, one or more of the displays may be operable to display various types of information such as, for example, one or more of the following (or combinations thereof): game play information, wagering information, player tracking information, bonus game information, etc. For example, in one embodiment display screen 314*a* may be linked to (or associated with) a first player (e.g., Player A) at the gaming table, and may be operable to display various types of information, including, for example, information relating to wagers which have been placed (and/or which are to be placed) by Player A.

One or more user input selection regions (e.g., 312*a-i*) which have been configured or designed for use with one or more user input devices.

Etc.

In at least one embodiment, gaming table system 300 may include a plurality of different player stations. In one embodiment, each player station may be associated with a respective player at the gaming table. For example, in at least one embodiment, each (or selected) player station(s) at the gaming table system 300 may include at least one respective display (e.g., 314*a*-314*h*). Thus, for example, in one embodiment, a first player (e.g., Player A) may occupy (or be associated with) a first player station at the gaming table which includes display 314*a*. A second player (e.g., Player B) at the gaming table may occupy a position at a second player station at the gaming table which includes (or is associated with) display 314*b*, etc.

In at least one embodiment, gaming table system 300 may be configured or designed to allow multiple different players at the gaming table to simultaneously or concurrently interact with common wagering region 302 to thereby allow each player to place one or more wagers (e.g., via that player's interaction with common wagering region 302) contemporaneously with the wagering activities performed by the other players at the gaming table. In at least one embodiment, common wagering region 302 maybe configured or designed to display static machine readable wager-related information (such as, for example, wager-related symbols and/or characters) via the use of non-electronic display mechanism(s) such as, for example, markings which have been printed on to a surface material used to cover at least a portion of the gaming table surface.

In at least one alternate embodiment, at least a portion of common wagering region 302 may be implemented via the use of an electronic display such as, for example, a multi-player, multi-touch display system.

Referring to the example of FIG. 3A, in at least one embodiment, one or more of the user input selection regions (e.g., 312*a*) maybe configured or designed to display static wager denomination values (e.g., $1, $2, $5, $10, etc.). In at least one embodiment, the displayed wager denomination information may include a first a portion of human-readable content comprising, for example, alpha-numeric characters, patterns, colors, and/or symbols which maybe observed and recognized by a human such as, for example, a player at the gaming table. Additionally, in at least one embodiment, the displayed wager denomination information may include a second portion of machine-readable content which, for example, maybe detected and/or read by a player's UID. In at least one embodiment, a player at the gaming table may engage his or her UID to read a selected portion of content displayed at a selected user input selection region.

In at least one embodiment, a player's user input device (UID) may be operable to read various types of information from one or more user input selection regions at the gaming table. For example, in one embodiment, one or more of the user-input selection regions may be configured or designed to display wager-input selection information (e.g., such as, for example, various different wager denomination values, etc.) which, for example, may be read by a player's UID, and/or which may be used to facilitate selection, input, review, and/or modification of the player's wagers and/or wagering instructions. In at least one embodiment, at least a portion of the user input selection regions may be configured or designed to display (or provide access to) machine readable data which maybe read, detected, and/or otherwise interpreted by one or more user input devices.

Figure 3B:
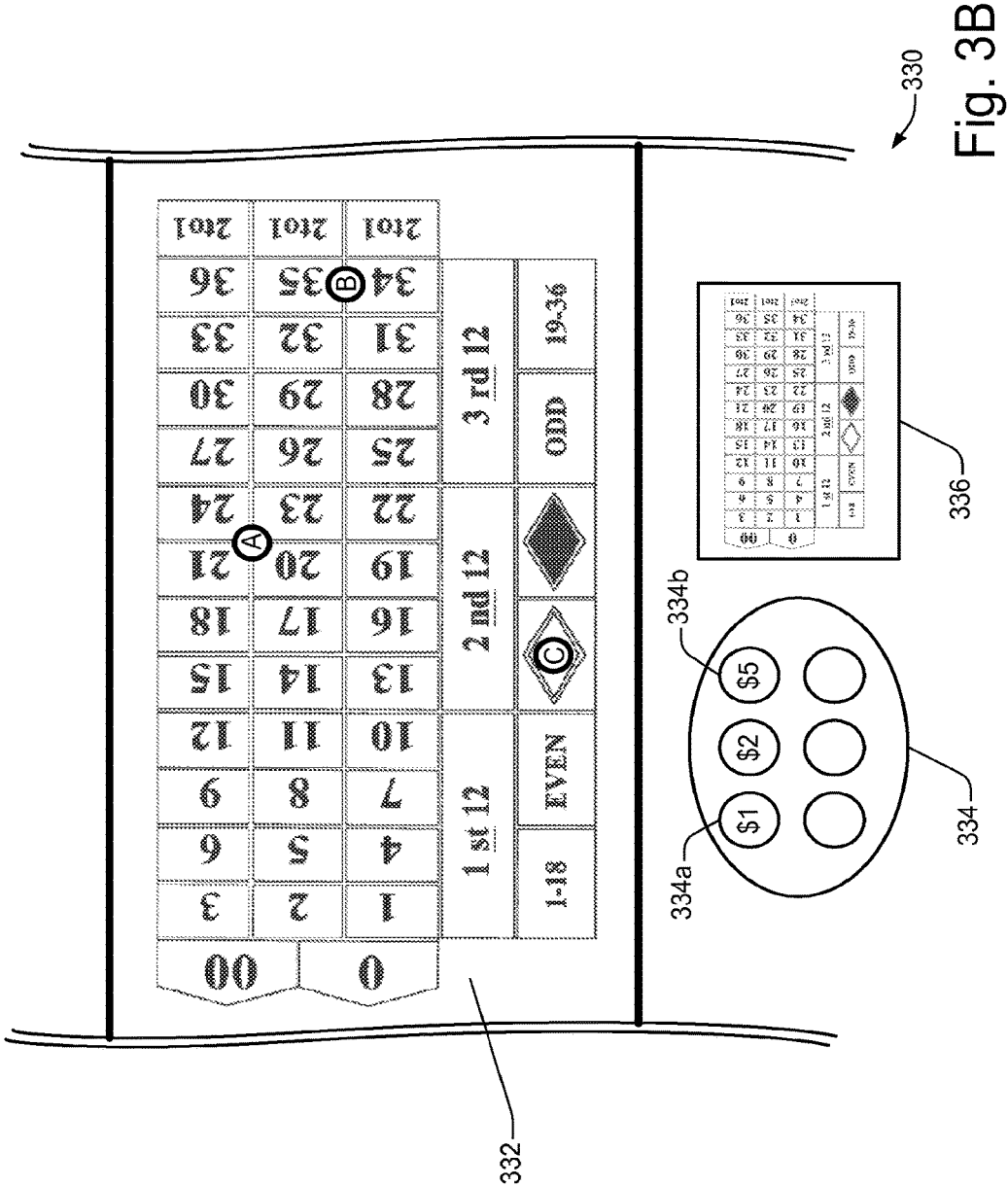

FIG. 3B shows an example embodiment of a portion 330 of a gaming table system which may be used for implementing various aspects described herein. For purposes of illustration, it is assumed that portion 330 corresponds to an example portion of gaming table 300 which is to be used by a player (e.g., Player A) at the gaming table for conducting game play and/or wagering activities via the use of the player's UID.

As illustrated in the example of FIG. 3B, gaming table portion 330 includes a shared or common player wagering region (e.g., 332) which, for example, may be concurrently accessed or used by one or more players at the gaming table for placing wagers and/or for performing various wager-related activities.

As illustrated in the example of FIG. 3B, gaming table portion 330 also includes user input selection region 334. In this particular example, it is assumed that user input selection region 334 includes display static information relating to wager denomination values (e.g., "$1" 334*a*, "$2", "$5" 334*b*, etc.). in this example it is further assume that each of the regions of displayed wager denomination values (e.g., 334*a*, 334*b*) include a respective portion of machine-readable content which, for example, maybe detected and/or read by a player's UID.

For example, in one embodiment, display region 334*a* may include machine-readable content (e.g., patterns, symbols, colors, etc.) for conveying to a machine, device, and/or other system that region 334*a* is associated with a wager denomination value of "$1." Similarly, display region 334*b* may include machine-readable content for conveying to a machine, device, and/or other system that region 334*a* is associated with a wager denomination value of "$5."

Additionally, as illustrated in the example of FIG. 3B, gaming table portion 330 includes electronic display region 336, which, for example, is configured or designed to display a graphical representation of wagers placed (and/or to be placed) by Player A at the gaming table. Another example of electronically displayed graphical information representing wager information relating to Player A is illustrated, for example, in FIG. 3C.

In at least one embodiment, Player A may operate his or her user input device (UID) to read various types of information from one or more user input selection regions at the gaming table, which, for example, may be used to facilitate selection, input, review, and/or modification of the player's wagers and/or wagering instructions.

Figure 3C:
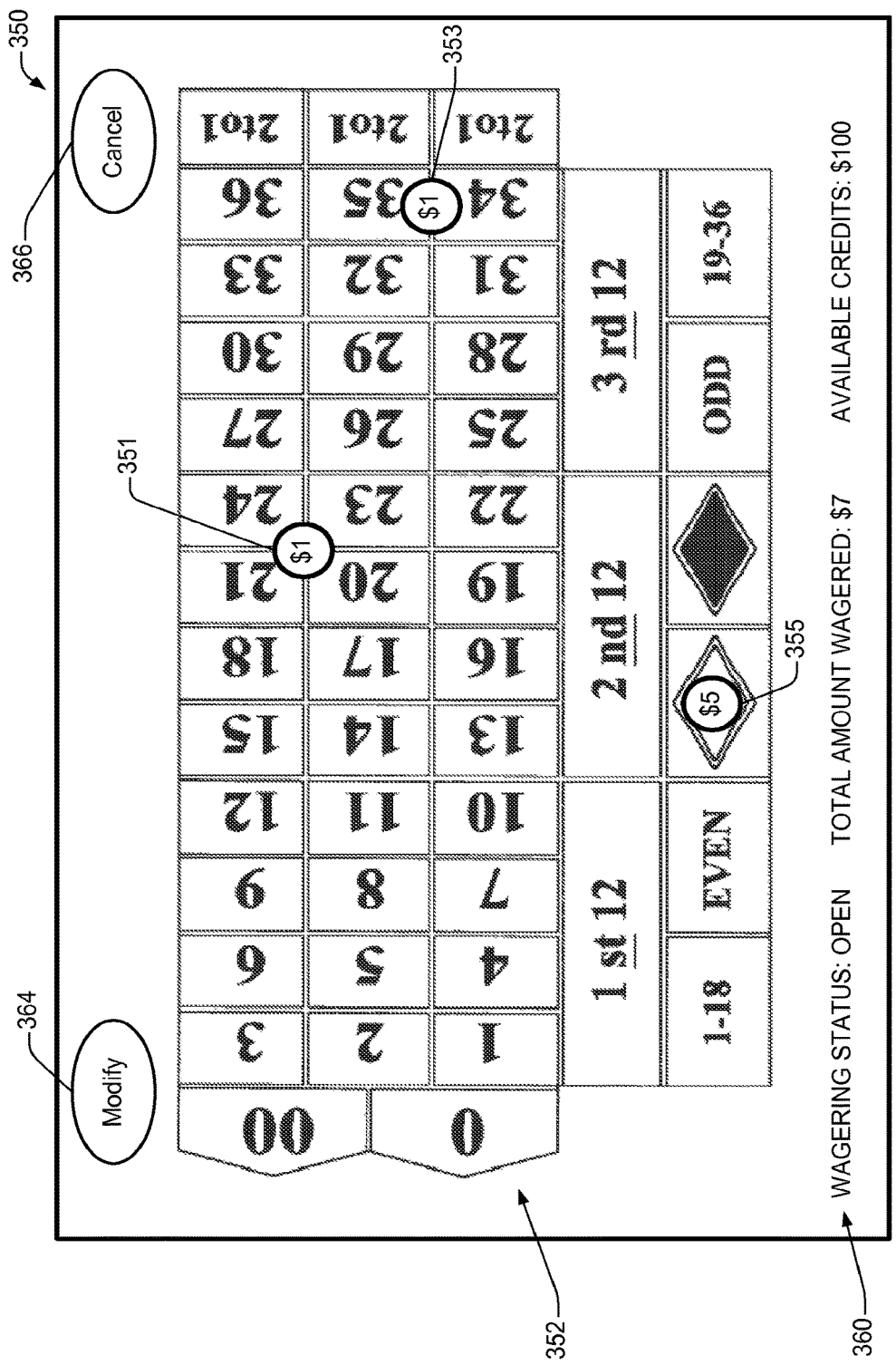

Thus, for example, for purposes of illustration, it is assumed in the example of FIGS. 3B and 3C that Player A performs the following actions:

Player A operates his UID to contact region 334*a*.
UID performs a read of information associated with region 334*a* (e.g., the UID reads the $1 denomination value).
Player A operates his UID to contact location A of common player wagering region 332.
Player A's UID communicates with the gaming table system.
The gaming table system interprets the information from the UID and/or other information relating to Player A's wagering activities as an instruction to place a $1 wager on behalf of Player A at location A of common player wagering region 332.
Player A operates his UID to contact location B of common player wagering region 332.
Player A's UID communicates with the gaming table system.
The gaming table system interprets the information from the UID and/or other information relating to Player A's wagering activities as an instruction to place a $1 wager on behalf of Player A at location B of common player wagering region 332.
Player A operates his UID to contact region 334*b*.
UID performs a read of information associated with region 334*b* (e.g., the UID reads the $5 denomination value).
Player A operates his UID to contact location C of common player wagering region 332.
Player A's UID communicates with the gaming table system.
The gaming table system interprets the information from the UID and/or other information relating to Player A's wagering activities as an instruction to place a $5 wager on behalf of Player A at location C of common player wagering region 332

In at least one embodiment, each time the gaming table system recognizes an instruction to place a wager on behalf of Player A, it may update the content displayed in electronic display region 336 (e.g., in real time) in order to provide Player A with a graphical representation of wagers placed (and/or to be placed) by Player A at the gaming table.

FIG. 3C shows an example embodiment of an electronic display portion 350 which is configured or designed to display textual and/or graphical information relating to wager information associated with a player at a gaming table. For purposes of illustration it is assumed in the example of FIG. 3C that the information displayed in electronic display portion 350 includes information representing one or more wagers 351, 353, 355) placed on behalf of Player A as a result of Player A's activities described previously in the example of FIG. 3B.

As illustrated in the example of FIG. 3C, electronic display portion 350 includes content portion 352 representing the common player wagering region (e.g., 332, FIG. 3B).

In at least one embodiment, at least a portion of the content displayed in portion 350 may be associated with (or linked to) Player A. In this way, the gaming table system (and/or other systems) may filter at least a portion of the content to be displayed in display portion 350 so as to provide information which is associated with and/or relevant to Player A. Thus, for example, as illustrated in the example of FIG. 3C, display portion 350 includes information representing only those wagers 351, 353, 355) associated with Player A.

In at least one embodiment, electronic display portion 350 may include other content such as, for example, one or more of the following (or combinations thereof):

content (e.g., 364) for allowing a player to change or modify criteria relating to one or more wagers placed on behalf of the player;

content (e.g., 366) for allowing a player to cancel one or more wagers placed on behalf of the player;

content (e.g., 366) for allowing a player to add additional wagers to be placed on behalf of the player;

content (e.g., 360) relating to other information which may be associated with a given player such as, for example: game play status, wager session status (e.g., open, closed, paid, etc.), total amount(s) wagered, cash or credits available to the player for wagering, etc.

In at least one embodiment, the gaming table system may be operable to access, determine and/or generate at least a portion of the content displayed in electronic display portion 350. In some embodiments, other portion(s) of the content displayed in electronic display portion 350 may be generated and/or provided from other systems such as, for example, remote server systems, financial/accounting systems, player tracking systems, etc.

Figure 3D:
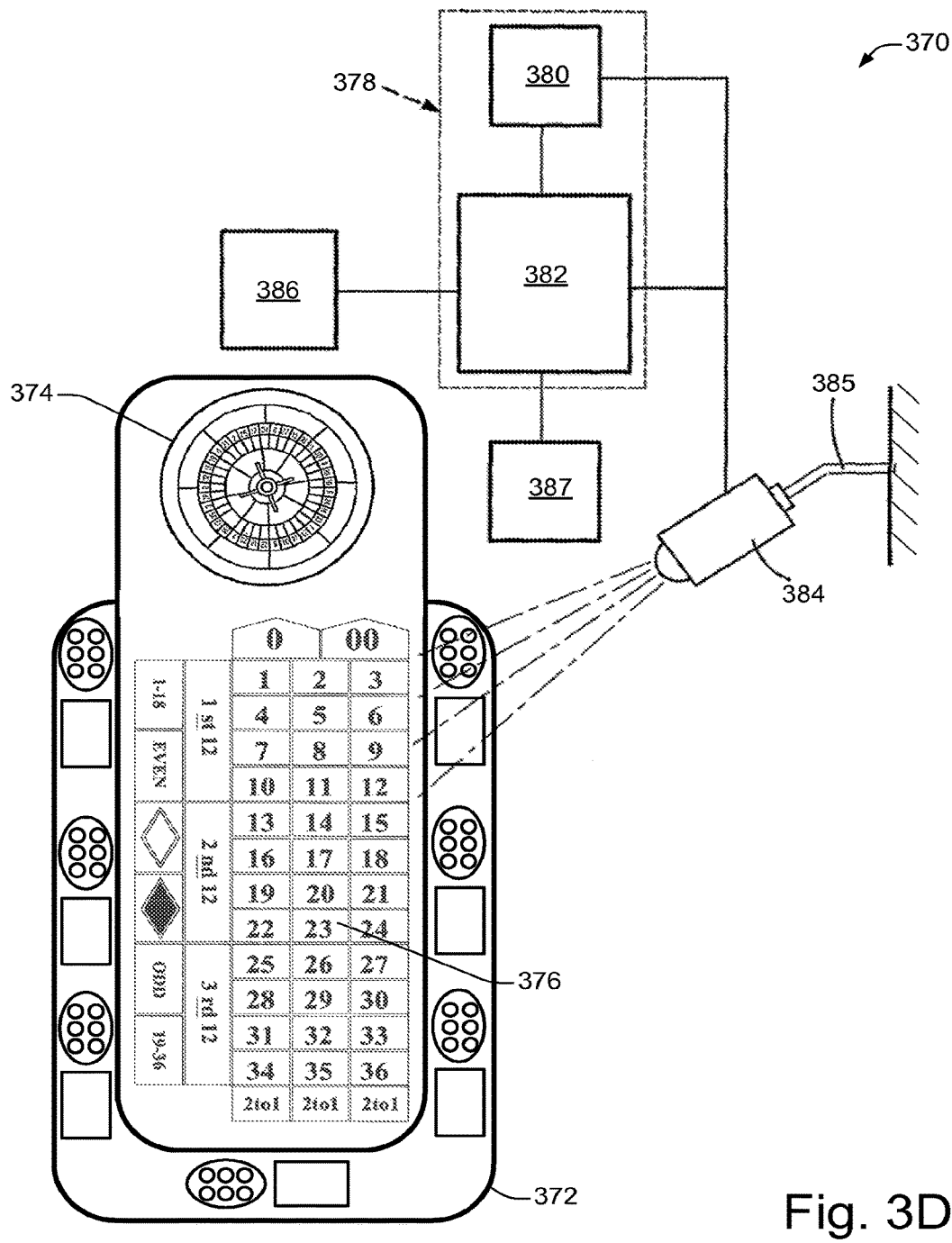

FIG. 3D shows an example embodiment of a gaming system 370 which, for example, may be used for facilitating implementation of various aspects and/or features described herein.

For example, in at least one embodiment, gaming system 370 may be operable to facilitate and/or perform a variety of tasks such as, for example, one or more of the following (or combinations thereof):

table game state tracking;

payout calculation (e.g., calculation of player winnings/losses);

payout distribution (e.g., electronically distributing winnings or payouts to players);

real-time tracking of UID positions/locations;

real-time tracking or monitoring of player locations, activities and/or gestures;

interpretation of player game play input instructions;

interpretation of player wager input instructions;

etc.

For example, in one embodiment, the gaming system may be configured or designed to calculate payouts in a game of roulette played at a roulette table 372 having a roulette wheel 374 and a betting area 376.

In at least one embodiment, the gaming system 370 comprises a computer 378 comprising a memory 380 and a processor 382, a video camera 384 for capturing color video images of the roulette wheel 374, the betting area 376, player stations, etc.

In one embodiment, gaming system 370 may include a croupier monitor 386 having a touch screen display. A further player monitor 387 may be provided for displaying information that can be seen by players in a game of roulette. The display screen of the monitor 386 is visible to the croupier in charge of the game.

In at least one embodiment, the gaming system 370 may be operable to allow both electronically placed wagers (e.g., using one or more UIDs) and non-electronically placed wagers (e.g., via the use of conventional game wager tokens or wagering chips which may be manually placed by players on the common wagering area).

In at least one embodiment, the video camera 384 may be positioned above the roulette table and may be moveable so as to capture images of desired regions at or adjacent to the gaming table. In one embodiment, the gaming system includes a motor for moving the camera so as to permit panning of the camera, as desired. The camera may also be mounted to a mounting support 385 in an arrangement wherein the camera can revolve so as to track a ball spinning in the roulette wheel 374 during a game of roulette.

In one embodiment, the camera 384 is caused to pan to the betting area 376 of the roulette table. A number of video images of the betting area are captured by camera and sent in the form of digital output signals to the processor 382 for processing. Using the image processing software, the layout of the betting area is "mapped" by recording the relative positions of line markings on the betting area demarcating separate betting regions and the numbers associated with each of the demarcated betting regions. This information may be stored in the memory 380 of the computer. In addition, odds corresponding to possible betting positions on the line markings and in the betting regions of the betting area, may be entered into the computer and stored in the memory 380.

In at least one embodiment, each digital video image may be saved either to disk or to the memory together with additional information such as, for example, one or more of the following (or combinations thereof): date, time, table number, game number, session number, winning number, bet location and number of each type of chip, the total number of chips found in each stack. For security purposes or to resolve disputes concerning payouts, reference can be had to the stored video images of the winning chips.

The processor then extracts the odds stored in the memory 380 corresponding to the position of the winning chips on the betting area. The processor then applies the odds to the winning wagers and calculates the payouts payable in relation to the different types of winning wagers. In one embodiment, payouts relating to electronically placed winning wagers may be automatically electronically distributed to the appropriate winning players (such as, for example, by updating a player's "available credits" value at the gaming system).

Figure 6:
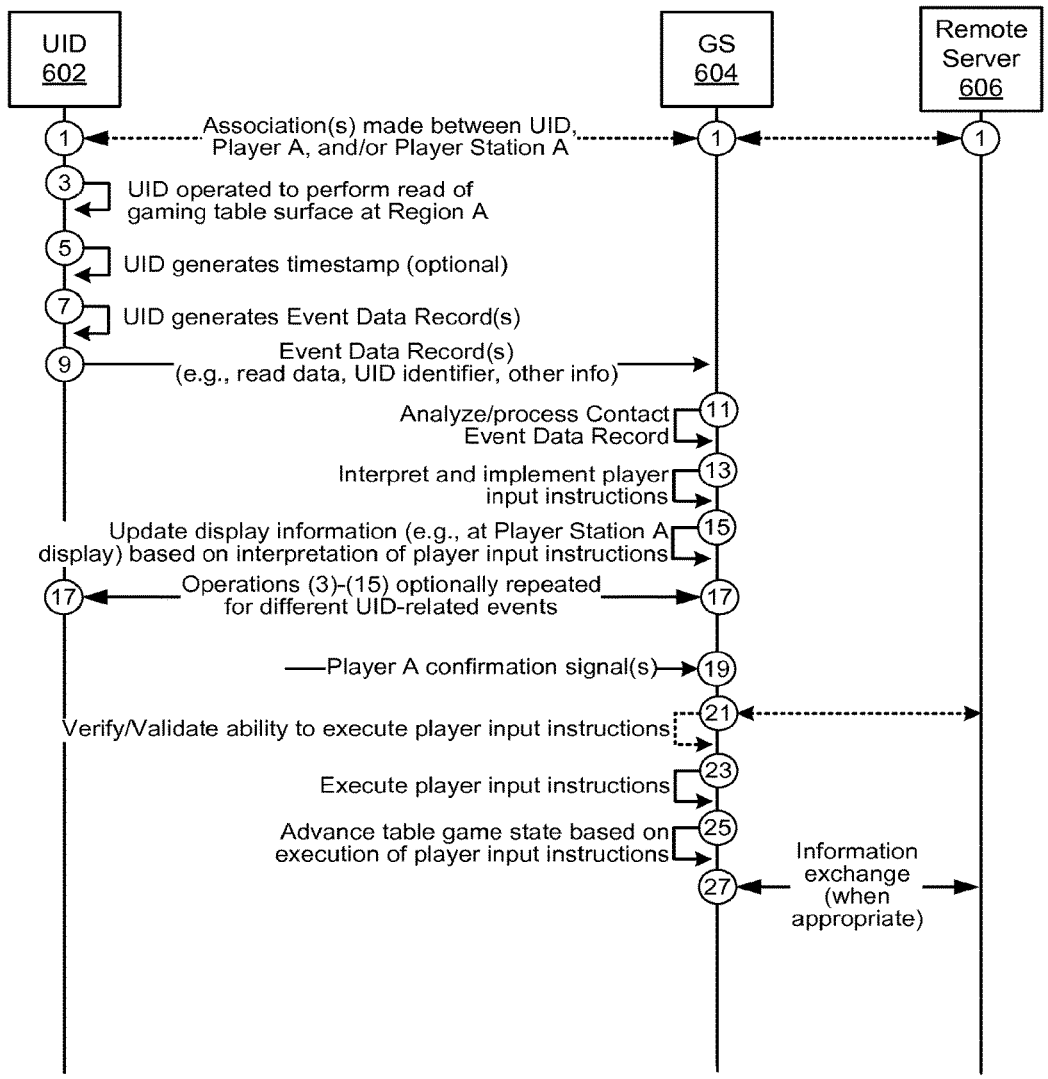
FIGS. 6-7 show different example embodiments of interaction diagrams.
Figure 7:
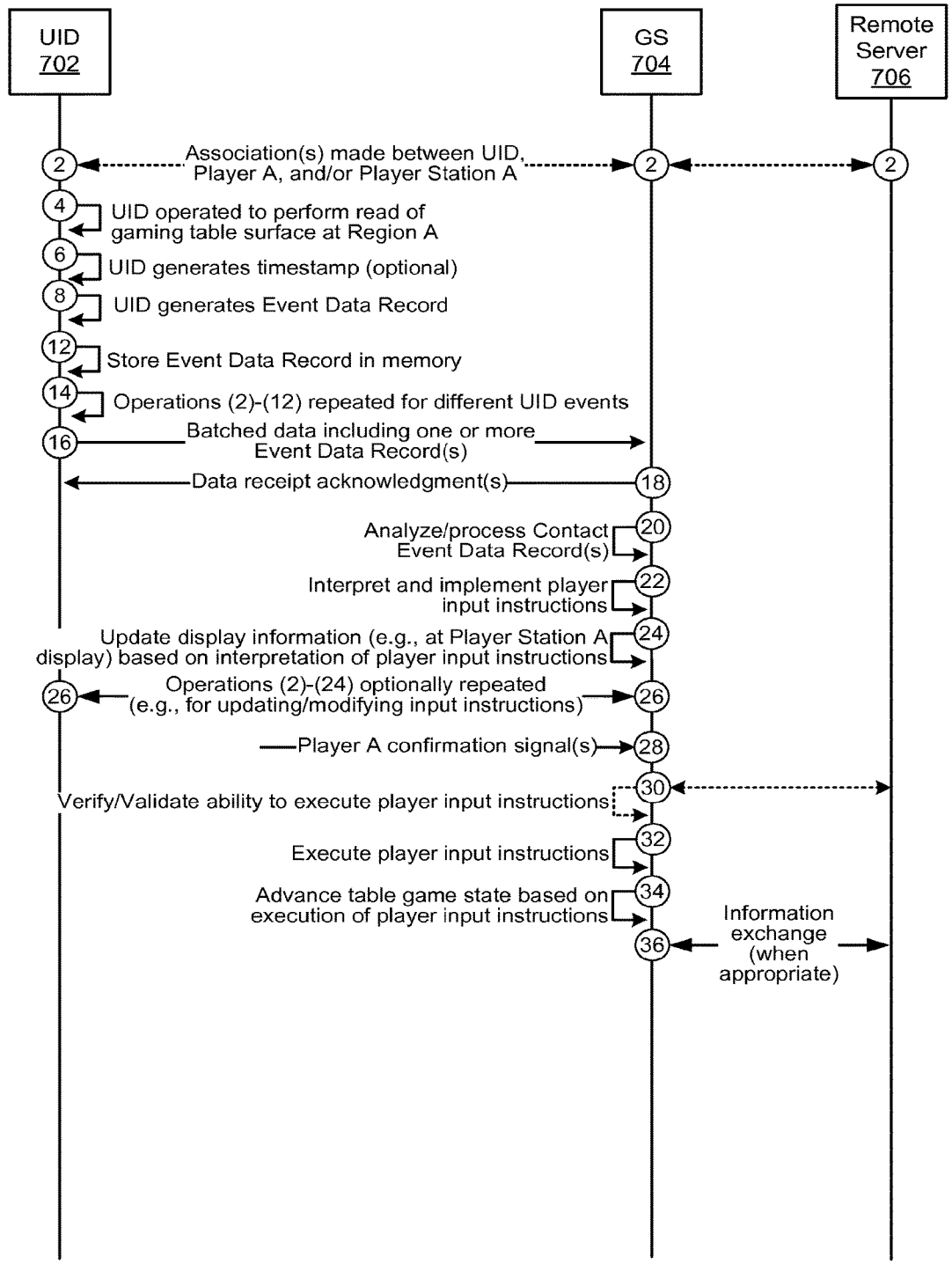

FIGS. 6-7 show different example embodiments of interaction diagrams illustrating various interactions which may occur, for example, between a gaming system (GS) (e.g., gaming machine system, gaming table system, etc.), a UID, and a remote server.

For purposes of illustration, it is assumed in the examples of FIGS. 6-7 that a player (e.g., Player A, who is in possession of a UID) desires to utilize the UID for use in conducting wagering and/or game play activities at a given casino gaming system such as, for example, gaming table system portion 200 of FIG. 2.

Further, for purposes of illustration, the interaction diagram of FIG. 6 will now be described by way of example with reference to the specific gaming table system embodiments illustrated in FIGS. 3A-D of the drawings.

In the example embodiment of FIG. 6, it is assumed that Player A occupies a position at Player Station A of a gaming table associated with gaming system (GS) 604. Additionally, it is assumed at (1) that one or more associations have been made between UID 602, Player A, and/or Player Station A. In at least one embodiment, such associations may be recorded locally at the gaming system 604 and/or remotely at a remote systems such as, for example, remote server 606.

In at least one embodiment, unique UID-Player Station associations and/or unique UID-Player associations may be created at or before the beginning of each new round so that each UID is configured to be operable for sending and/or receiving data associated with a unique player and/or player station at the gaming system.

Of course one or more conditions may occur which justify exceptions to this feature. For example, if a player's UID fails during game play, after the round has started, the dealer may authorize a replacement UID to be issued to the player, and may further override or modify the existing UID-Player Station associations to allow the replacement UID to be properly configured. In another example, a player may be required to move to a different player station at the gaming system after the round has started (such as, for example, in the case of a device failure at the player's current player station). In such situations, the dealer may override or modify the existing UID-Player Station associations to allow the player's UID to be properly configured and associated with the new player station occupied by that player.

In at least one embodiment, the establishing of unique UID-Player Station associations and/or unique UID-Player associations may include activities relating to registration of one or more UIDs in order to allow the UIDs to be used for game play, wagering, and/or other activities conducted at gaming system 604.

According to specific embodiments, various events/conditions may trigger automatic registration of a UID at the gaming system 604. Examples of such events/conditions may include, but are not limited to, one or more of the following (or combinations thereof):

physical proximity of UID to gaming system detected as satisfying predetermined criteria;
UID shown or handed to dealer and/or other casino employee;
appropriate input detected at UID (e.g., player pushes button, performs gesture, etc.);
communication received from gaming system;
specified time constraints detected as being satisfied;
gaming chip(s) placed detected within player's assigned wagering region;
presence of player detected at player station;
detection of player's first wager being placed;
player location or position detected as satisfying predefined criteria;
appropriate floor supervisor input detected;
player identity determined (e.g., through the use of directional RFID; through placement of player tracking media on a designated spot at a table game; etc.);
etc.

In at least one embodiment, the processing of the registration for a given UID may include various types of activities such as, for example, one or more of the following (or combinations thereof): authentication activities and/or validation activities relating to the UID and/or player; account verification activities; etc.

In at least one embodiment, a UID may change or update its current mode or state of operation to one which is appropriate for use with the gaming activities and/or wagering activities being conducted at gaming system 604. In at least one embodiment, the UID may utilize information provided by the gaming system to select or determine the appropriate mode of operation of the UID. For example, in one embodiment, the gaming system 604 may correspond to a playing card game table which is currently configured as a blackjack game table. The gaming system may provide gaming system information to the UID which indicates to the UID that the gaming system 604 is currently configured as a Blackjack game table. In response, the UID may configure its current mode of operation for blackjack game play, blackjack wagering, and/or blackjack player input gesture recognition/interpretation. In at least one embodiment, interpretation of a player's gestures and/or movements at the UID may be based, at least in part, on the current mode of operation of the UID. Thus, for example, in one embodiment, the same gesture implemented by a player may be interpreted differently by the UID, for example, depending upon the type of game currently being played by the player.

In the present example, it is assumed that associations have been made between UID 602, Player A, and Player Station A.

At (3) it is assumed that UID 602 is operated to perform a read of information (e.g., input data) associated with Region A of the gaming table surface. In one embodiment, Player A may operate the UID 602 to make contact with a region of the gaming table surface corresponding to Region A. In at least one embodiment, the UID may be operable perform an optical read of information displayed within Region A. In other embodiments, the UID may be operable to perform a read of information (such as, for example, RFID information) associated with Region A using one or more wireless communication protocols.

For example, in at least one embodiment, the UID may be operable to read or detect input data which, for example, includes machine readable data such as, for example, one or more of the following (or combinations thereof):

static optical patterns (e.g., different colors, IR barcodes, etc)
dynamic optical patterns (e.g., different regions of strobing lights)
wireless signal detection (e.g., RFID, triangulation/position tracking signals)

For purposes of this example, it assumed that Region A corresponds to region 334a of FIG. 3B. Accordingly, in this example, when the UID performs a read of information associated with region 334a (FIG. 3B), the UID may read and record information relating to the $1 denomination value associated with region 334a.

At (5) it is assumed that the UID may (optionally) generate timestamp information relating to the read event. According to different embodiments, the timestamp information may include a variety of different types of information such as, for example, one or more of the following (or combinations thereof):

timestamp info
player ID
processed data (e.g., using information from the read data)
authentication data
player station ID
location data
etc.

At (7) it is assumed that the UID processes the input data and generates an event data record. Examples of different embodiments of event data records are illustrated and described, for example, with respect to FIGS. 5A-C of the drawings. In at least one embodiment, the event data record may be stored in local memory of the UID.

Examples of different types of information which may be stored at (and/or used to populate) an event data record may include, but are not limited to, one or more of the following (or combinations thereof):

UID identifier information (e.g., which may be used for uniquely identifying that particular UID);
timestamp information;
data record length information;

user ID information (e.g., which may be used for uniquely identifying the current user of the UID;
information read by or received at the UID;
UID location information;
etc.

At (9) it is assumed that the UID 602 transmits one or more event data record(s) to the gaming system 604. According to one embodiment, UID 602 may be operable to automatically transmit each newly created event data record to gaming system 604 after the event data record has been created. In other embodiments, UID 602 may be operable to automatically transmit one or more data records to the gaming system 604 at periodic intervals and/or upon the occurrence of specific events and/or conditions.

At (11) it is assumed that the gaming system 604 analyzes and/or processes information from the received Event Data Record(s). In at least one embodiment, such analysis and/or processing may include, for example, one or more of the following (or combinations thereof): validation, authentication, data filtering, determination whether input is currently allowed, etc.

At (13) it is assumed that the gaming system uses at least a portion of the processed data to interpret player input instructions. In at least one embodiment, the instructions may include, for example, game play instructions, wager instructions, and/or other player input instructions.

Additionally, in at least one embodiment, gaming system 604 may be operable to use at least a portion of the processed data associate the interpreted player input instructions with Player A and/or Player Station A.

For example, in the present example, it is assumed that the UID 602 transmits to the gaming system 604 an event data record which includes information relating to the $1 denomination value associated with region 334*a*. The gaming system may process the received information, and interpret the processed information as an instruction by Player A to set the current wager denomination value (e.g., for placement of subsequent wagers at the gaming table) at $1. According to a specific embodiment, once the current wager denomination parameter has been set to a particular value (e.g., $1), Player A may then use UID 602 for placing one or more $1 wagers at various locations of the common player wagering region (e.g., 332, FIG. 3B).

Additionally, in at least one embodiment, the interpreted player input instructions may be used for generating and/or displaying (17) updated display information and/or content, which, for example, may be displayed at one or more displays at the gaming system (such as, for example, display 336, FIG. 3B).

As shown at (17), one or more of the operations (3)-(15) of FIG. 6 may optionally be repeated for different UID-related events initiated by Player A.

For example, in the example described previously with respect to FIGS. 3B and 3C, after the current wager denomination parameter has been set to a particular value (e.g., $1), Player A may operate his UID to contact one or more locations on the common player wagering region (e.g., 332, FIG. 3B). According to different embodiments, the UID 602 and/or gaming system 604 may be operable to identify each location of contact which the UID makes with the common player wagering region, and may further be operable to process and interpret such information and/or other information relating to Player A's wagering activities as one or more instruction(s) to place, for example, a separate wager (e.g., separate $1 wager, if current wager denomination value=$1) at each location of the common player wagering region where the UID made contact.

Further, in at least one embodiment, each time the gaming table system recognizes an instruction to place a wager on behalf of Player A, it may update the content displayed in electronic display region 336 (e.g., in real time) in order to provide Player A with a graphical representation of wagers placed (and/or to be placed) by Player A at the gaming table.

Thus, for example, in one embodiment, as shown, for example, in the example of FIG. 3C, the information displayed in electronic display portion 350 includes information representing one or more wagers 351, 353, 355) electronically placed on behalf of Player A as a result of Player A's activities with UID 602.

Additionally, in at least one embodiment, the UID may also be operated by a user (e.g., Player A) to perform a read of machine readable information which is displayed on (or with may be accessed from) other objects such as, for example, a paper voucher, coupon, ticket, wagering tokens, credit cards, electronically display which are operable to display machine readable content, etc. For example, in one embodiment, wagering credits (and/or other indicia which may be used for wagering) may be issued to a player by way of a printed voucher or ticket which includes machine-readable data representing to an amount or value of wagering credits associated with that specific voucher or ticket. In one embodiment, a player may use his or her UM to read the machine-readable data on the voucher or ticket. Further, in at least one embodiment, the credit information read from the player's voucher or ticket may be provided to gaming system 604 and used to allocate an amount of wagering credits for use by that player in placing wagers at the gaming system.

In at least one embodiment, Player A may be provided with an opportunity to approve, modify and/or cancel one or more proposed wagers which are represented in the electronic display.

In the example of FIG. 6, it is assumed at (19) that Player A provides input confirming the placement of the wagers which are graphically represented in the electronic display region. According to different embodiments, such confirmation input data may be provided via the player's UID and/or may be provided via the use of other input devices.

At (21) one or more procedures may be automatically implemented or initiated for verifying and/or validating Player A's input instructions (e.g., wagering instructions) before the player input instructions may be officially executed (e.g., before Player A's wagers are officially placed/recorded). In at least one embodiment, at least a portion of the verification and/or validation procedures may be implemented at a remote system such as, for example, Remote Server 606. In at least one embodiment, various different criteria may be used to perform verification and/or validation of the player input instructions. Examples of such criteria may include, for example one or more of the following (or combinations thereof): game rules, table wagering limits, funds/credits available to Player A for placing wagers at gaming system 604, etc.

In the present example, it is assumed that the player input instructions are successfully validated and/or verified. Accordingly, at (23), gaming system 604 may take appropriate actions for implementing or initiating execution of the player input instructions.

At (25) the state of game play (and/or other states associated with game play at the gaming system 604) may be advanced, for example, based on execution of the player input instructions. For example, in one embodiment, the current game state of the game being played at gaming system 604 may be advanced, for example, based at least in part upon the player's instructions provided via UID 602. In at least one embodiment, the game state may not advance until specific conditions have been satisfied.

At (27), the gaming system 604 may exchange information with one or more remote systems such as, for example, remote server 606. According to specific embodiments, such information exchanges may automatically occur at periodic intervals and/or upon the occurrence of specific events and/or conditions.

In at least one embodiment, the information relating to the player's instructions, as well as other desired information (such as current game state information, etc.) may be stored in a database (e.g., local and/or remote database(s)). Such information may be subsequently used, for example, for auditing purposes, player tracking purposes, etc.

According to specific embodiments, the inputs allowed via the UID interfaces may be regulated in each gaming jurisdiction in which such interfaces are deployed, and may vary from gaming jurisdiction to gaming jurisdiction. For example, for a voice interface, certain voice commands may be allowed/required in one jurisdiction but not another. In at least one embodiment, the UIDs and/or gaming systems may be configurable such that by inputting the gaming jurisdiction where the UID/gaming system is located (or by specifying it in a software package shipped with the UID/gaming system), the UID/gaming system may self-configure itself to comply with the regulations of the jurisdiction where it is located.

Another aspect of UID and/or gaming system operations that may also by regulated by a gaming jurisdiction is providing game history retrieval capabilities. For instance, for dispute resolution purposes, it is often desirable to be able to replay information from a past game, such as the outcome and/or payouts relating to a previous game played at the gaming system. Accordingly, in some embodiments, it may be desirable to store information regarding inputs made through a UID and provide a capability of playing information regarding the input stored by the UID and/or gaming system.

In at least one embodiment, interpreted player input instructions (e.g., based on a player's manipulation of a UID) may be recorded and/or stored in an indexed and/or searchable manner which allows the user gesture information to be easily accessed and retrieved for auditing purposes. For example, in at least one embodiment, player gestures and/or player input interpreted there from may be stored along with concurrent game state information to provide various types of audit information such as, for example, game audit trail information, player input audit trail information, etc. In one embodiment, the game audit trail information may include information suitable for enabling reconstruction of the steps that were executed during selected previously played games as they progressed through one game and into another game. In at least one embodiment, the game audit trail information may include all steps of a game. In at least one embodiment, player input audit trail information may include information describing one or more players' input relating to one or more previously played games. In at least one embodiment, the game audit trail information may be linked with player input audit trail information in a manner which enables subsequent reconstruction of the sequence of game states which occurred for one or more previously played game(s), including reconstruction of the player(s) instructions (e.g., game play instructions, wagering instructions, etc.) which triggered the transition of each recorded game state.

FIG. 7 shows an example of an alternate embodiment of interaction diagram illustrating various interactions which may occur, for example, between a gaming system (GS) (e.g., gaming machine system, gaming table system, etc.), a UID, and a remote server.

For purposes of illustration, it is assumed in the examples of FIG. 7 that a player (e.g., Player A, who is in possession of a UID) desires to utilize the UID for use in conducting wagering and/or game play activities at a given casino gaming system such as, for example, gaming table system portion 200 of FIG. 2.

Further, for purposes of illustration, the interaction diagram of FIG. 7 will now be described by way of example with reference to the specific gaming table system embodiments illustrated in FIGS. 3A-D of the drawings.

In the example embodiment of FIG. 7, it is assumed that Player A occupies a position at Player Station A of a gaming table associated with gaming system (GS) 704. Additionally, it is assumed at (2) that one or more associations have been made between UID 702, Player A, and/or Player Station A. In at least one embodiment, such associations may be recorded locally at the gaming system 704 and/or remotely at a remote systems such as, for example, remote server 706.

In at least one embodiment, unique UID-Player Station associations and/or unique UTD-Player associations may be created at or before the beginning of each new round so that each UID is configured to be operable for sending and/or receiving data associated with a unique player and/or player station at the gaming system.

In the present example, it is assumed that a associations have been made between UID 702, Player A, and Player Station A.

At (4) it is assumed that UID 702 is operated to perform a read of information (e.g., input data) associated with Region A of the gaming table surface. In one embodiment, Player A may operate the UID 702 to make contact with a region of the gaming table surface corresponding to Region A. In at least one embodiment, the UID may be operable perform an optical read of information displayed within Region A. In other embodiments, the UID may be operable to perform a read of information (such as, for example, RFID information) associated with Region A using one or more wireless communication protocols.

For example, in at least one embodiment, the UID may be operable to read or detect input data which, for example, includes machine readable data such as, for example, one or more of the following (or combinations thereof):

static optical patterns (e.g., different colors, IR barcodes, etc)
  dynamic optical patterns (e.g., different regions of strobing lights)
  wireless signal detection (e.g., RFID, triangulation/position tracking signals)

For purposes of this example, it assumed that Region A corresponds to region 334*a* of FIG. 3B. Accordingly, in this example, when the UID performs a read of information associated with region 334*a* (FIG. 3B), the UID may read and record information relating to the $1 denomination value associated with region 334*a*.

At (6) it is assumed that the UID may (optionally) generate timestamp information relating to the read event. According to different embodiments, the timestamp information may include a variety of different types of information such as, for example, one or more of the following (or combinations thereof):

timestamp info
  player ID processed data (e.g., using information from the read data)
authentication data
player station ID
location data
etc.

At (8) it is assumed that the UID processes the input data and generates an event data record. Examples of different embodiments of event data records are illustrated and described, for example, with respect to FIGS. 5A-C of the drawings.

Examples of different types of information which may be stored at (and/or used to populate) an event data record may include, but are not limited to, one or more of the following (or combinations thereof):

UID identifier information (e.g., which may be used for uniquely identifying that particular UID);
timestamp information;
data record length information;
user ID information (e.g., which may be used for uniquely identifying the current user of the UID;
information read by or received at the UID;
UID location information;
etc.

At (12) it is assumed that the UID 702 stores the event data record in local memory of the UID.

As shown at (14), one or more of the operations (2)-(12) of FIG. 7 may optionally be repeated for different UID-related events initiated by Player A.

For example, in the example described previously with respect to FIGS. 3B and 3C, Player A may operate his UID to contact one or more locations on the common player wagering region (e.g., 332, FIG. 3B). According to different embodiments, the UID 702 and/or gaming system 704 may be operable to identify each location of contact which the UID makes with the common player wagering region.

In at least one embodiment, for each event where Player A operates the UID to make contact with a location on the gaming table, the UID may be operable generate one or more event data record(s) relating to a given event or combination of events.

At (16) it is assumed that the UID 702 transmits to the gaming system 704 batched data relating to one or more event data record(s). In some embodiments, UID 702 may be operable to automatically transmit one or more data records to the gaming system 704 at periodic intervals and/or upon the occurrence of specific events and/or conditions.

At (18) the gaming system 704 may provide one or more an acknowledgement message(s) to the UID 702, acknowledging receipt of one or more event data records.

At (20) it is assumed that the gaming system 704 analyzes and/or processes information from the received Event Data Record(s). In at least one embodiment, such analysis and/or processing may include, for example, one or more of the following (or combinations thereof): validation, authentication, data filtering, determination whether input is currently allowed, etc.

At (22) it is assumed that the gaming system uses at least a portion of the processed data to interpret player input instructions. In at least one embodiment, the instructions may include, for example, game play instructions, wager instructions, and/or other player input instructions.

Additionally, in at least one embodiment, gaming system 704 may be operable to use at least a portion of the processed data associate the interpreted player input instructions with Player A and/or Player Station A.

For example, in the present example, it is assumed that the UID 702 transmits to the gaming system 704 information relating to a series of different UID-related events such as those describe previously in the example of FIG. 3B (e.g., Player A operates his UID to contact region 334a; Player A operates his UID to contact location A of common player wagering region 332; Player A operates his UID to contact location B of common player wagering region 332; Player A operates his UID to contact region 334b; Player A operates his UID to contact location C of common player wagering region 332; etc.). In at least one embodiment, the gaming system may process the received information, and interpret the processed information to determine instructions by Player A for placing different wagers of different denominations at different locations of the common player wagering region (as shown, for example, in FIG. 3C).

Additionally, in at least one embodiment, the interpreted player input instructions may be used for generating and/or displaying (24) updated display information and/or content, which, for example, may be displayed at one or more displays at the gaming system. An example of such updated display information/content is illustrated in FIG. 3C.

Thus, for example, in one embodiment, as shown, for example, in the example of FIG. 3C, the information displayed in electronic display portion 350 includes information representing one or more wagers 351, 353, 355) electronically placed on behalf of Player A as a result of Player A's activities with MD 702.

As shown at (26), one or more of the operations (2)-(24) of FIG. 7 may optionally be repeated for different UID-related events initiated by Player A. Further, in at least one embodiment, each time the gaming table system recognizes an instruction to place a wager on behalf of Player A, it may update (e.g., in real time) the content displayed in the player's associated electronic display region in order to provide Player A with a graphical representation of wagers placed (and/or to be placed) by Player A at the gaming table.

In at least one embodiment, Player A may be provided with an opportunity to approve, modify and/or cancel one or more proposed wagers which are represented in the electronic display.

In the example of FIG. 7, it is assumed at (28) that Player A provides input confirming the placement of the wagers which are graphically represented in the electronic display region. According to different embodiments, such confirmation input data may be provided via the player's UID and/or may be provided via the use of other input devices.

At (30) one or more procedures may be automatically implemented or initiated for verifying and/or validating Player A's input instructions (e.g., wagering instructions) before the player input instructions may be officially executed (e.g., before Player A's wagers are officially placed/recorded). In at least one embodiment, at least a portion of the verification and/or validation procedures may be implemented at a remote system such as, for example, Remote Server 706. In at least one embodiment, various different criteria may be used to perform verification and/or validation of the player input instructions. Examples of such criteria may include, for example one or more of the following (or combinations thereof): game rules, table wagering limits, funds/credits available to Player A for placing wagers at gaming system 704, etc.

In the present example, it is assumed that the player input instructions are successfully validated and/or verified. Accordingly, at (32), gaming system 704 may take appropriate actions for implementing or initiating execution of the player input instructions.

At (34) the state of game play (and/or other states associated with game play at the gaming system 704) may be advanced, for example, based on execution of the player input instructions. For example, in one embodiment, the current game state of the game being played at gaming system 704 may be advanced, for example, based at least in part upon the player's instructions provided via UID 702. In at least one embodiment, the game state may not advance until specific conditions have been satisfied.

At (36), the gaming system 704 may exchange information with one or more remote systems such as, for example, remote server 706. According to specific embodiments, such information exchanges may automatically occur at periodic intervals and/or upon the occurrence of specific events and/or conditions.

In at least one embodiment, the information relating to the player's instructions, as well as other desired information (such as current game state information, etc.) may be stored in a database (e.g., local and/or remote database(s)). Such information may be subsequently used, for example, for auditing purposes, player tracking purposes, etc.

Figure 8:
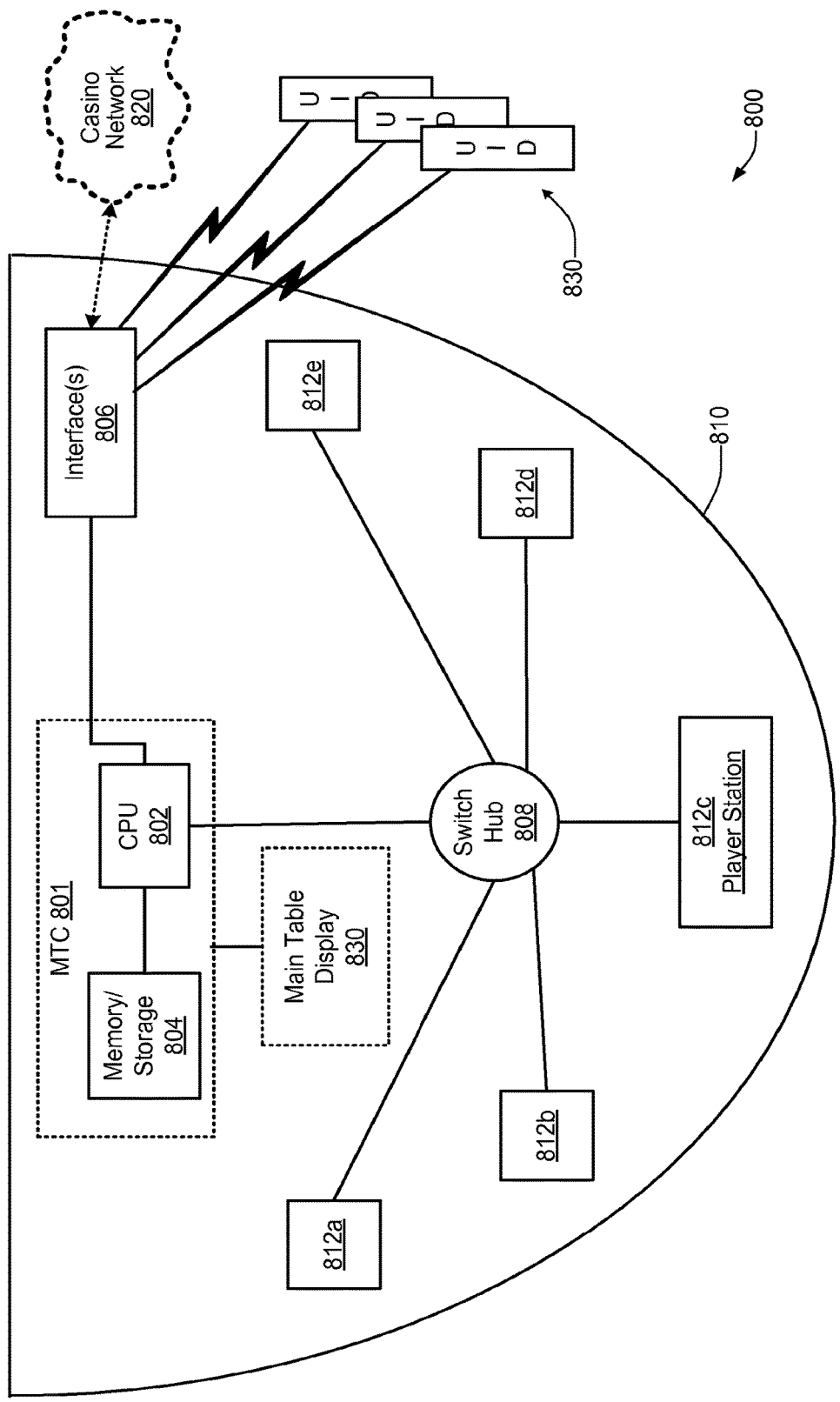
FIG. 8 is a simplified block diagram of a gaming table system 800 in accordance with a specific embodiment.

FIG. 8 is a simplified block diagram of a gaming table system 800 in accordance with a specific embodiment. As illustrated in the embodiment of FIG. 8, gaming table system 800 includes a master table controller (MTC) 801, one or more displays, and a plurality of electronic player stations (e.g., 812*a-e*) which, for example, may be connected to the MTC 801 via at least one switch or hub 808. In at least one embodiment, master table controller 801 may include at least one processor or CPU 802, and memory 804. Additionally, as illustrated in the example of FIG. 8, gaming table system 800 may also include one or more interfaces 806 for communicating with one or more UIDs 830 and/or other devices and/or systems of a casino network 820.

According to specific embodiments, the gaming table system 800 may include a wireless communication system operable to perform wireless data communication with one or more UIDs 830. Such a data communication may be operable to facilitate exchange of various types of information between gaming table system 800 and UIDs 830, such as, for example, game play information, wagering information, and/or other types of information relating to various activities conducted at the casino gaming table.

According to specific embodiments, MTC 801 may be include functionality for performing and/or facilitating a variety of different operations such as, but not limited to, one or more of the following:

- sending and/or receiving information to/from one or more UIDs;
- perform authentication/verification of one or more UIDs;
- record associations between a UID and a player;
- record associations between a UID and a player station at the gaming table system;
- keep track of player wagering instructions/activities;
- keep track of cards in each player's hand;
- tabulate game/bonus outcomes and/or options;
- display game play status/results;
- log game history data;
- detect, authenticate and/or verify wagering chips used for game play wagering;
- provide instructions to dealer/player(s);
- communicate with other devices/systems in the casino gaming network such as, for example: gaming servers; promotion servers; software update servers; bonusing systems; game download systems; player tracking systems; accounting servers; back betting systems; progressive play systems;
- tournament play systems; ticket in/ticket out systems; etc.;
- control peripheral devices such as, for example: printers, lights, buttons, card readers, casino chip readers, cameras, bill validators, displays, player tracking components, ticket readers, etc;
- implement other functionality similar to that of MTC 212 of FIG. 2;
- etc.

According to one embodiment, gaming table system 800 may be operable to read, receive signals, and/or obtain information from various types of media (e.g., player tracking cards) and/or other devices such as those issued by the casino. For example, media detector/reader may be operable to automatically detect wireless signals (e.g., 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.) from one or more wireless devices (such as, for example, an RFID-enabled player tracking card) which, for example, are in the possession of players at the gaming table. The media detector/reader may also be operable to utilize the detected wireless signals to determine the identity of individual players associated with each of the different player tracking cards. The media detector/reader may also be operable to utilize the detected wireless signals to access additional information (e.g., player tracking information) from remote servers (e.g., player tracking server).

In at least one embodiment, each player station may include a respective media detector/reader.

In at least one embodiment, each UID may include a unique RFID identification tag which allows the gaming table system 800 to automatically detect the presence of a UID at the gaming table, and which allows the gaming table system to uniquely identify each detected UID.

In at least one embodiment, gaming table system 800 may be operable to detect and identify objects (e.g., electronic objects and/or non-electronic objects) which are placed on the gaming table surface. For example, in at least one embodiment, one or more cameras of the gaming table system (such as that shown, for example, in FIG. 3D) may be used to monitor and/or capture images of objects which are placed on the surface of the gaming table, and the image data may be used to identify and/or recognize various objects detected on or near the surface of the gaming table. Additional details regarding gaming table object recognition techniques are described, for example, in U.S. patent application Ser. No. 11/938,179, by Wells et al., entitled "TRANSPARENT CARD DISPLAY," filed on Nov. 9, 2007, incorporated herein by reference in its entirety.

In at least one embodiment, Gaming table system 800 may also be operable to determine and create ownership or possessor associations between various objects detected at the gaming table and the various players (and/or casino employees) at the gaming table. For example, in one embodiment, a player (or casino employee) at gaming table system 800 may initiate registration of the player's UID with the gaming table system. In performing registration of the UID, the gaming table system may be operable to: (1) identify and recognize the UID; (2) identify the player at the gaming table system to be associated as the current owner of the UID; and (3) create an "ownership" association between the identified UID and the identified player (which may be subsequently stored and used for various tracking and/or auditing purposes).

According to a specific embodiment, the media detector/reader may also be operable to determine the position or location of one or more players at the gaming table, and/or able to identify a specific player station which is occupied by a particular player at the gaming table.

As used herein, the terms "gaming chip" and "wagering token" may be used interchangeably, and, in at least one embodiment, may refer to a chip, coin, and/or other type of token which may be used for various types of casino wagering activities, such as, for example, gaming table wagering.

In at least one embodiment, gaming table system 800 may also include components and/or devices for implementing at least a portion of gaming table functionality described in one or more of the following patents, each of which is incorporated herein by reference in its entirety for all purposes: U.S. Pat. No. 5,735,742, entitled "GAMING TABLE TRACKING SYSTEM AND METHOD"; and U.S. Pat. No. 5,651,548, entitled "GAMING CHIPS WITH ELECTRONIC CIRCUITS SCANNED BY ANTENNAS IN GAMING CHIP PLACEMENT AREAS FOR TRACKING THE MOVEMENT OF GAMING CHIPS WITHIN A CASINO APPARATUS AND METHOD."

Figure 9:
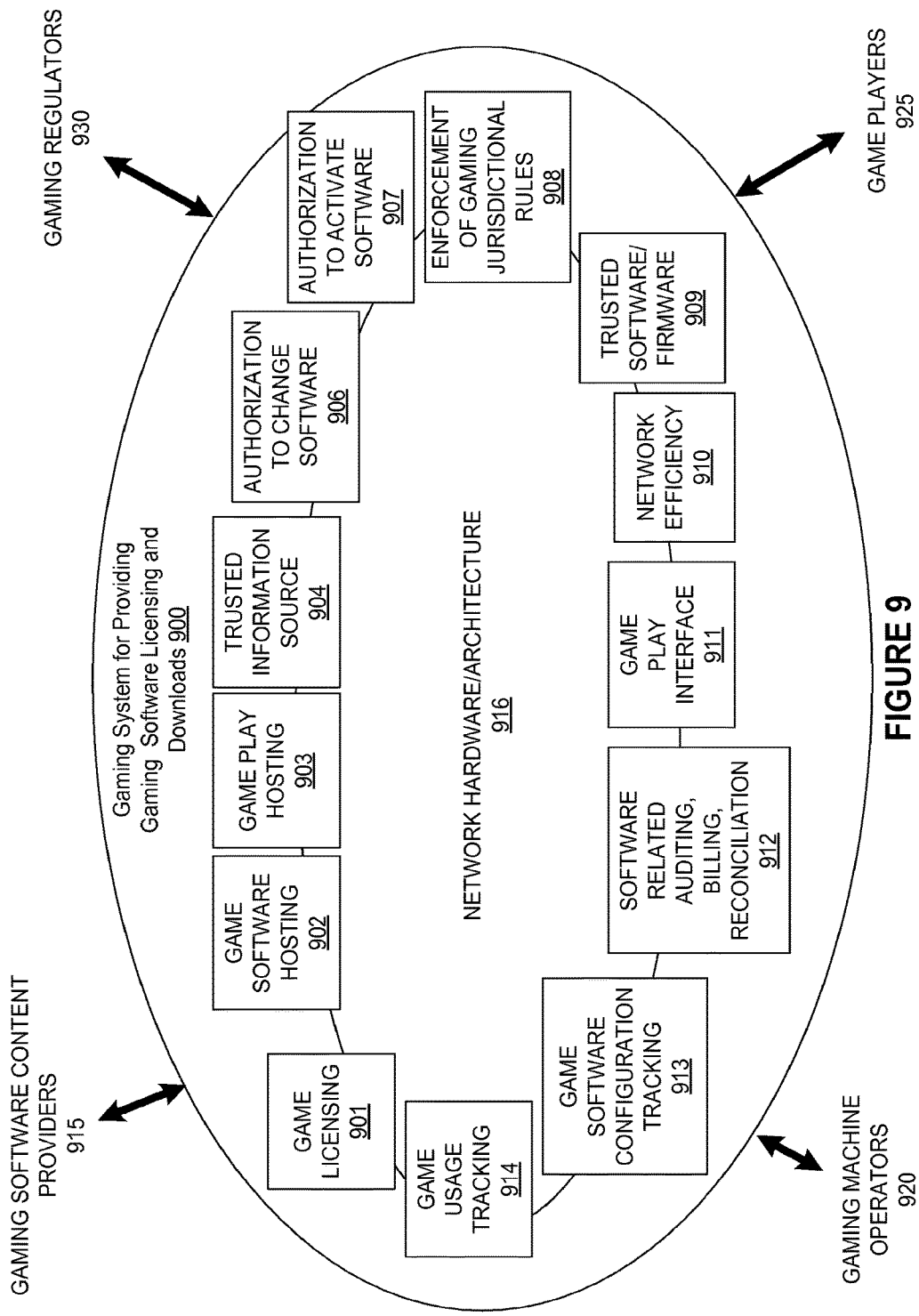
FIG. 9 shows a block diagram illustrating components of a gaming system 900 which may be used for implementing various aspects of example embodiments.

FIG. 9 shows a block diagram illustrating components of a gaming system 900 which may be used for implementing various aspects of example embodiments. In FIG. 9, the components of a gaming system 900 for providing game software licensing and downloads are described functionally. The described functions may be instantiated in hardware, firmware and/or software and executed on a suitable device. In the system 900, there may be many instances of the same function, such as multiple game play interfaces 911. Nevertheless, in FIG. 9, only one instance of each function is shown. The functions of the components may be combined. For example, a single device may comprise the game play interface 911 and include trusted memory devices or sources 909.

The gaming system 900 may receive inputs from different groups/entities and output various services and or information to these groups/entities. For example, game players 925 primarily input cash or indicia of credit into the system, make game selections that trigger software downloads, and receive entertainment in exchange for their inputs. Game software content providers 915 provide game software for the system and may receive compensation for the content they provide based on licensing agreements with the gaming machine operators. Gaming machine operators select game software for distribution, distribute the game software on the gaming devices in the system 900, receive revenue for the use of their software and compensate the gaming machine operators. The gaming regulators 930 may provide rules and regulations that must be applied to the gaming system and may receive reports and other information confirming that rules are being obeyed.

In the following paragraphs, details of each component and some of the interactions between the components are described with respect to FIG. 9. The game software license host 901 may be a server connected to a number of remote gaming devices that provides licensing services to the remote gaming devices. For example, in other embodiments, the license host 901 may 1) receive token requests for tokens used to activate software executed on the remote gaming devices, 2) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 914 may track the usage of game software on a plurality of devices in communication with the host. The game usage-tracking host 914 may be in communication with a plurality of game play hosts and gaming machines. From the game play hosts and gaming machines, the game usage tracking host 914 may receive updates of an amount that each game available for play on the devices has been played and on amount that has been wagered per game. This information may be stored in a database and used for billing according to methods described in a utility based licensing agreement.

The game software host 902 may provide game software downloads, such as downloads of game software or game firmware, to various devious in the game system 900. For example, when the software to generate the game is not available on the game play interface 911, the game software host 902 may download software to generate a selected game of chance played on the game play interface. Further, the game software host 902 may download new game content to a plurality of gaming machines via a request from a gaming machine operator.

In one embodiment, the game software host 902 may also be a game software configuration-tracking host 913. The function of the game software configuration-tracking host is to keep records of software configurations and/or hardware configurations for a plurality of devices in communication with the host (e.g., denominations, number of paylines, paytables, max/min bets). Details of a game software host and a game software configuration host that may be used with example embodiments are described in U.S. Pat. No. 6,645,077, by Rowe, entitled, "Gaming Terminal Data Repository and Information System," filed Dec. 21, 2000, which is incorporated herein in its entirety and for all purposes.

A game play host device 903 may be a host server connected to a plurality of remote clients that generates games of chance that are displayed on a plurality of remote game play interfaces 911. For example, the game play host device 903 may be a server that provides central determination for a bingo game play played on a plurality of connected game play interfaces 911. As another example, the game play host device 903 may generate games of chance, such as slot games or video card games, for display on a remote client. A game player using the remote client may be able to select from a number of games that are provided on the client by the host device 903. The game play host device 903 may receive game software management services, such as receiving downloads of new game software, from the game software host 902 and may receive game software licensing services, such as the granting or renewing of software licenses for software executed on the device 903, from the game license host 901.

In particular embodiments, the game play interfaces or other gaming devices in the gaming system 900 may be portable devices, such as electronic tokens, cell phones, smart cards, tablet PC's and PDA's. The portable devices may support wireless communications and thus, may be referred to as wireless mobile devices. The network hardware architecture 916 may be enabled to support communications between wireless mobile devices and other gaming devices in gaming system. In one embodiment, the wireless mobile devices may be used to play games of chance.

The gaming system 900 may use a number of trusted information sources. Trusted information sources 904 may be devices, such as servers, that provide information used to authenticate/activate other pieces of information. CRC values used to authenticate software, license tokens used to allow the use of software or product activation codes used to activate to software are examples of trusted information that might be provided from a trusted information source 904. Trusted information sources may be a memory device, such as an EPROM, that includes trusted information used to authenticate other information. For example, a game play interface 911 may store a private encryption key in a trusted memory device that is used in a private key-public key encryption scheme to authenticate information from another gaming device.

When a trusted information source 904 is in communication with a remote device via a network, the remote device will employ a verification scheme to verify the identity of the trusted information source. For example, the trusted information source and the remote device may exchange information using public and private encryption keys to verify each other's identities. In another example of an embodiment, the remote device and the trusted information source may engage in methods using zero knowledge proofs to authenticate each of their respective identities. Details of zero knowledge proofs that may be used with example embodiments are described in US publication no. 2003/0203756, by Jackson, filed on Apr. 25, 2002 and entitled, "Authentication in a Secure Computerized Gaming System, which is incorporated herein in its entirety and for all purposes.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 900 of example embodiments may include devices 906 that provide authorization to download software from a first device to a second device and devices 907 that provide activation codes or information that allow downloaded software to be activated. The devices, 906 and 907, may be remote servers and may also be trusted information sources. One example of a method of providing product activation codes that may be used with example embodiments is describes in previously incorporated U.S. Pat. No. 6,264,561.

A device 906 that monitors a plurality of gaming devices to determine adherence of the devices to gaming jurisdictional rules 908 may be included in the system 900. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum bet limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may used to check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 900 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, i.e., game software approved for use on gaming devices by a local gaming jurisdiction may be required on gaming devices on the gaming machine.

In example embodiments, the devices may be connected by a network 916 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to viable. Thus, in example embodiments, network efficient devices 910 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in example embodiments may provide game software and game licensing related auditing, billing and reconciliation reports to server 912. For example, a software licensing billing server may generate a bill for a gaming device operator based upon a usage of games over a time period on the gaming devices owned by the operator. In another example, a software auditing server may provide reports on game software downloads to various gaming devices in the gaming system 900 and current configurations of the game software on these gaming devices.

At particular time intervals, the software auditing server 912 may also request software configurations from a number of gaming devices in the gaming system. The server may then reconcile the software configuration on each gaming device. In one embodiment, the software auditing server 912 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 9. Many of the interactions are coupled. For example, methods used for game licensing may affect methods used for game downloading and vice versa. For the purposes of explanation, details of a few possible interactions between the components of the system 900 relating to software licensing and software downloads have been described. The descriptions are selected to illustrate particular interactions in the game system 900. These descriptions are provided for the purposes of explanation only and are not intended to limit the scope of example embodiments described herein.

Additional details relating to various aspects of gaming technology are described in one or more of the following references:

U.S. Provisional Patent Application Ser. No. 60/986,507, by Burrill et al., entitled "AUTOMATED TECHNIQUES FOR TABLE GAME STATE TRACKING," filed on Nov. 8, 2007, the entirety of which is incorporated herein by reference for all purposes;

U.S. Provisional Patent Application Ser. No. 60/987,276, by Wells et al., entitled "INTELLIGENT STAND ALONE MULTIPLAYER GAMING TABLE WITH ELECTRONIC DISPLAY," filed on Nov. 12, 2007, the entirety of which is incorporated herein by reference for all purposes;

U.S. patent application Ser. No. 11/938,179, by Wells et al., entitled "TRANSPARENT CARD DISPLAY," filed on Nov. 9, 2007, the entirety of which is incorporated herein by reference for all purposes;

U.S. patent application Ser. No. 11/515,184, by Nguyen et al., entitled "INTELLIGENT CASINO GAMING TABLE AND SYSTEMS THEREOF", filed on Sep. 1, 2006, the entirety of which is incorporated herein by reference for all purposes;

U.S. patent application Ser. No. 11/938,179, by Wells et al., entitled "TRANSPARENT CARD DISPLAY," filed on Nov. 9, 2007, the entirety of which is incorporated herein by reference for all purposes;

U.S. patent application Ser. No. 11/865,581, by Mattice et al., entitled "MULTI-USER INPUT SYSTEMS AND PROCESSING TECHNIQUES FOR SERVING MULTIPLE USERS," filed on Oct. 1, 2007, the entirety of which is incorporated herein by reference for all purposes;

U.S. patent application Ser. No. 09/016,453, by Wanatabe et al., entitled "COORDINATE READING APPARATUS AND COORDINATE INDICATOR", filed Jan. 30, 1998, the entirety of which is incorporated herein by reference for all purposes;

U.S. patent application Ser. No. 11/381,473, by Gururajan et al., entitled "GAMING OBJECT RECOGNITION", filed May 3, 2006, the entirety of which is incorporated herein by reference for all purposes;

U.S. patent application Ser. No. 11/384,427, by Gururajan et al., entitled "TABLE GAME TRACKING", filed Mar. 21, 2006, the entirety of which is incorporated herein by reference for all purposes; and U.S. patent application Ser. No. 11/515,361, by Steil et al., entitled "GAME PHASE DETECTOR", filed Sep. 1, 2006, the entirety of which is incorporated herein by reference for all purposes.

Techniques and mechanisms of the present invention will sometimes be described in singular form for clarity. However, it should be noted that particular embodiments include multiple iterations of a technique or multiple instantiations of a mechanism unless noted otherwise.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

The invention claimed is:

1. An electronic table comprising:
a base;
a display device supported by the base;
a plurality of player positions associated with a plurality of machine-readable codes;
a communication system supported by the base; and
a controller supported by the base and configured to:
establish wireless communication with a user device via the communication system;
receive, from the user device and via the communication system, data representing a first machine-readable code of the plurality of machine-readable codes;
associate the user device with a first player position based on the first machine-readable code represented by the received data; and
cause the user device to display content.

2. The electronic table of claim 1, wherein the controller is further configured to cause the display device to display one or more of the plurality of machine-readable codes.

3. The electronic table of claim 1, wherein the controller is further configured to associate the user device with the first player position in part in response to the user device reading the first machine-readable code.

4. The electronic table of claim 1, wherein the controller is further configured to, after establishing communication with the user device, monitor a distance of the user device from the electronic table.

5. The electronic table of claim 4, wherein the controller is further configured to, after establishing communication with the user device, enable the user device to perform a first function when the user device is within a designated distance of the electronic table and prevent the user device from performing the first function when the user input is not within the designated distance of the electronic table.

6. The electronic table of claim 5, wherein the first function includes an ability to display the content.

7. The electronic table of claim 1, wherein the controller is further configured to send to the user device and via the communication interface data to cause the user device to change its operating mode.

8. The electronic table of claim 7, wherein the data comprises an identification of a game mode for which the controller is currently configured.

9. The electronic table of claim 1, wherein the controller is further configured to receive location information relating to a location of a detected contact between the user device and the display device, perform a first action responsive to determining that the location of the detected contact is a first location, and perform a second action responsive to determining that the location of the detected contact is a second location different from the first location.

10. The electronic table of claim 1, wherein the controller is further configured to:
increase a credit balance of a player associated with the user device in part in response to the user device reading a second machine-readable code of a ticket.

11. The electronic table of claim 10, wherein the controller is further configured to establish communication with a server via the communication system and to increase the credit balance of the player in part in response to an instruction received from the server.

12. A method of operating an electronic table comprising a base, a display device supported by the base, a plurality of player positions associated with a plurality of machine-readable codes, a communication system supported by the base, and a controller supported by the base, the method comprising:
establishing, by the communication system, wireless communication with a user device;
receiving, from the user device via the communication system, data representing a first machine-readable code of the plurality of machine-readable codes;
associating, by the controller, the user device with a first player position based on the first machine-readable code represented by the received data; and
causing, by the controller, the user device to display content.

13. The method of claim 12, further comprising causing, by the controller, the display device to display one or more of the machine-readable codes.

14. The method of claim 12, wherein associating, by the controller, the user device with the first player position comprises associating, by the controller, the user device with the first player position in part in response to the user device reading the first machine-readable code.

15. The method of claim 12, further comprising monitoring, by the controller and after establishing communication with the user device, a distance of the user device from the electronic table.

16. The method of claim 15, further comprising, after establishing communication with the user device, enabling, by the controller, the user device to perform a first function when the user device is within a designated distance of the electronic table and preventing, by the controller, the user device from performing the first function when the user input is not within the designated distance of the electronic table.

17. The method of claim 16, wherein the first function includes an ability to display content.

18. The method of claim 16, further comprising increasing, by the controller, a credit balance of a player associated with the user device in part in response to the user device reading a machine-readable code of a ticket.

19. The method of claim 18, further comprising establishing, by the communication system, communication with a server and increasing, by the controller, the credit balance of the player in part in response to an instruction received from the server.

20. The method of claim 12, further comprising sending, to the user device and via the communication interface, data to cause the user device to change its operating mode.

21. The method of claim 20, wherein the data comprises an identification of a game mode for which the controller is currently configured.

22. The method of claim 12, further comprising receiving, by the controller, location information relating to a location of a detected contact between the user device and the display device; performing, by the controller, a first action responsive to determining that the location of the detected contact is a first location; and performing, by the controller, a second action responsive to determining that the location of the detected contact is a second location different from the first location.

* * * * *